US007830872B2

(12) United States Patent
Yokoyama et al.

(10) Patent No.: US 7,830,872 B2
(45) Date of Patent: Nov. 9, 2010

(54) SIGNAL PROCESSING DEVICE, METHOD, AND COMPUTER READABLE MEDIUM

(75) Inventors: Akihisa Yokoyama, Tokyo (JP); Hiroshi Harada, Koganei (JP); Hitoshi Inoue, Tokyo (JP); Makoto Honda, Tokyo (JP)

(73) Assignees: Toyota Infotechnology Center Co., Ltd., Tokyo (JP); National Institute of Information and Communications Technology, Tokyo (JP)

( * ) Notice: Subject to any disclaimer, the term of this patent is extended or adjusted under 35 U.S.C. 154(b) by 701 days.

(21) Appl. No.: 11/628,492

(22) PCT Filed: Jun. 3, 2005

(86) PCT No.: PCT/JP2005/010258

§ 371 (c)(1),
(2), (4) Date: Sep. 5, 2007

(87) PCT Pub. No.: WO2005/122502

PCT Pub. Date: Dec. 22, 2005

(65) Prior Publication Data

US 2008/0043746 A1    Feb. 21, 2008

(30) Foreign Application Priority Data

Jun. 7, 2004 (JP) ............... 2004-169217

(51) Int. Cl.
*H04L 12/28* (2006.01)
(52) U.S. Cl. .............. 370/389; 370/229; 370/235; 370/392; 370/395.53; 370/412; 709/213; 712/11; 712/28
(58) Field of Classification Search ........... 370/229, 370/230, 235, 389, 392, 395.52, 400, 412, 370/428, 535
See application file for complete search history.

(56) References Cited

U.S. PATENT DOCUMENTS 6,160,813 A * 12/2000 Banks et al. ............ 370/422

(Continued)

FOREIGN PATENT DOCUMENTS

WO    WO 2004/008719 A    1/2004

OTHER PUBLICATIONS

M. Farajmandi and L. Hughes, "The Design and Implementation of a Cartesian Router", IEEE Communication Networks and Services Research Conference 2005, May 2005, pp. 84-90.

(Continued)

*Primary Examiner*—Ayaz R Sheikh
*Assistant Examiner*—Andrew C Lee
(74) *Attorney, Agent, or Firm*—Miles & Stockbridge P.C.; James T. Carmichael

(57) ABSTRACT

To provide a signal processing section of a software radio device or the like which can dynamically change connection itself of an internal function structure at the time of execution. A switching module ISM1(2) or the like selects and uses one of the plurality of the routing tables (60) or the like prepared according to the signal processing and executes routing control to respective processing modules a11 or the like based on the input data packet. The processing module a11 or the like executes each processing by using a parameter table or the like indicating the processing to be performed in accordance with the data packet. A signal processing device (1) or the like inputs a parameter packet containing an identifier such as the processing module a11 or the like and the content of the parameter table such as the processing module a11 or the like via a rewriting path from the outside and transmits the parameter packet to the processing module a11 or the like specified by the identifier according to a predetermined condition, thereby dynamically rewriting the content of the parameter table via the rewriting path.

37 Claims, 15 Drawing Sheets

U.S. PATENT DOCUMENTS

| | | | |
|---|---|---|---|
| 6,483,817 B1* | 11/2002 | Antonio et al. | 370/328 |
| 6,614,796 B1* | 9/2003 | Black et al. | 370/403 |
| 6,807,172 B1* | 10/2004 | Levenson et al. | 370/389 |
| 7,042,842 B2* | 5/2006 | Paul et al. | 370/229 |
| 7,406,086 B2* | 7/2008 | Deneroff et al. | 370/400 |
| 7,581,081 B2* | 8/2009 | Gonzalez et al. | 712/28 |
| 7,643,486 B2* | 1/2010 | Belz et al. | 370/392 |
| 2002/0161887 A1* | 10/2002 | Foster et al. | 709/225 |
| 2002/0167902 A1* | 11/2002 | Foster et al. | 370/230 |
| 2003/0007493 A1 | 1/2003 | Oi et al. | |
| 2003/0037222 A1* | 2/2003 | Emberson et al. | 712/11 |
| 2003/0152075 A1* | 8/2003 | Hawthorne et al. | 370/389 |
| 2005/0159181 A1* | 7/2005 | Gadgil et al. | 455/554.2 |
| 2006/0165111 A1* | 7/2006 | Varma | 370/428 |

OTHER PUBLICATIONS

Yokoyama et al., "Packet Routing Oriented Signal Processing Platform Reconfigurable by Parameters", The Institute of Electronics, Information and Communication Engineers, Nov. 18, 2004, vol. 104, No. 439, pp. 31 to 36.

Paillassa B. et al.: "Flexible Satellites: Software Radio in the Sky", Telecommmunications, 2003. ICT 2003, 10$^{TH}$ International Conference on Feb. 23-Mar. 1, 2003, Piscataway, NJ, USA, IEEE, vol. 2, Feb. 23, 2003, XP010638034 ISBN: 978-0-7803-7661-8, Chapter B: Flexible packet processing, abstract, pp. 1596-1600.

Supplementary European Search Report dated Jul. 24, 2008.

Official Communication of EPO dated Oct. 16, 2008.

First Office Action of State Intellectual Property Office, P.R. China (English translation) date of issue Aug. 7, 2009. Chinese patent application 200580026477.6 filed Jun. 5, 2005, pp. 1-4.

* cited by examiner

60 ISM1 (20) side

| output destination \ input source | I/O section 10 (c1) | processing module a11 (c2) | processing module b15 (c3) | switching module ISM2 (30) (c4) |
|---|---|---|---|---|
| I/O section 10 (r1) | | | | 6 |
| processing module a11 (r2) | 0 | 1 | | |
| processing module b15 (r3) | | | | |
| switching module ISM2 (30) (r4) | | 1 | 2 | |

FIG. 3(A)

61 ISM2 (30) side

| output destination \ input source | switching module ISM1 (20) | processing module c12 (N/A) | processing module d13 | processing module e14 |
|---|---|---|---|---|
| switching module ISM1 (20) |  |  |  | 5 |
| processing module c12 (N/A) |  |  |  |  |
| processing module d13 | 3 |  |  |  |
| processing module e14 (input 1) | 3 |  |  |  |
| processing module e14 (input 2) |  |  | 4 |  |

FIG. 3 (B)

62 ISM1 (20) side

| input source \ output destination | I/O section 10 | low-pass filter processing module 51 | switching module ISM2 (30) | processing module b 15 (N/A) |
|---|---|---|---|---|
| I/O section 10 | | 6 | | |
| low-pass filter processing module 51 | 0 | | 5 | |
| switching module ISM2 (30) | | | | |
| processing module b 15 (N/A) | | | | |

FIG. 6 (A)

| 63  ISM2 (30) side | | | | |
|---|---|---|---|---|
| input source / output destination | switching module ISM1 (20) (c1) | band-limiting filter processing module 52 (c2) | PLL/FM demodulator processing module 53 (c3) | mixer processing module 54 (c4) |
| switching module ISM1 (20) (r1) |  |  |  | 4 |
| band-limiting filter processing module 52 (r2) | 1 |  |  |  |
| PLL/FM demodulator processing module 53 (r3) |  | 2 |  |  |
| mixer processing module 54 (input 1) (r4) |  | 2 |  |  |
| mixer processing module 54 (input 2) (r5) |  |  | 3 |  |

FIG. 6 (B)

64 ISM1 (20) side

| output destination \ input source | I/O section 10 (c1) | low-pass filter processing module 51 (c2) | switching module ISM2 (30) (c3) | processing module b15 (N/A) (c4) |
|---|---|---|---|---|
| I/O section 10 (r1) | | 5 | | |
| low-pass filter processing module 51 (r2) | 0 | | 4 | |
| switching module ISM2 (30) (r3) | | | | |
| processing module b15 (N/A) (r4) | | | | |

FIG. 9 (A)

| 65 ISM2 (30) side input source / output destination | switching module ISM1 (20) | processing module c (N/A) | PLL/FM demodulator processing module 53 | mixer processing module 54 |
|---|---|---|---|---|
| | c1 | c2 | c3 | c4 |
| r1 switching module ISM1 (20) | | | | 3 |
| r2 processing module c (N/A) | | | | |
| r3 PLL/FM demodulator processing module 53 | 1 | | | |
| r4 mixer processing module 54 (input 1) | 1 | | | |
| r5 mixer processing module 54 (input 2) | | | 2 | |

FIG. 9 (B)

SIGNAL PROCESSING DEVICE, METHOD, AND COMPUTER READABLE MEDIUM

TECHNICAL FIELD

The present invention relates to a signal processing device or the like which performs signal processing corresponding to an input data packet, and more particularly to a signal processing device or the like constituted of a combination of an arbitrary number of processing modules which perform signal processing with respect to signal data included in a data packet and an arbitrary number of switching modules which control an order of outputting data packets to the processing modules or the like.

BACKGROUND ART

In recent years, development of a software radio device whose internal function structure is reconfigurable has advanced. For example, Patent Reference 1 discloses, in response to an instruction from software, a software radio device provided with a signal processing section whose internal function structure can be reconfigured. The signal processing section is constituted by using a FPGA (Field Programmable Gate Array) or the like whose circuit configuration can be changed by rewriting software. Therefore, the signal processing section is reconfigured in accordance with a plurality of desired communication modes or signal processing functions in advance, and this reconfigured signal processing section is operated at the time of execution. Although Patent Reference 2 discloses a wireless device which establishes connection between some elements by using an FPGA, like the software radio device of Patent Reference 1, the FPGA is reconfigured in accordance with a plurality of desired communication modes or signal processing functions in advance and this reconfigured FPGA is operated at the time of execution.

Patent Reference 1: Japanese Patent Application Laid-open No. 2003-298456

Patent Reference 2: Japanese Patent No. 3413815

DISCLOSURE OF THE INVENTION

Problem to be Solved by the Invention

As described above, in a signal processing section of a conventional software radio device or the like, an internal function structure is reconfigured by using an FPGA or the like. Therefore, the signal processing section must be reconfigured in accordance with a plurality of desired communication modes or signal processing functions in advance and this reconfigured signal processing section must be operated at the time of execution. Accordingly, there is a problem that connection itself of the internal function structure cannot be dynamically changed in execution.

Therefore, the present invention has been achieved to solve the above-described problems, and it is an object of the present invention to provide a signal processing section of a software radio device or the like which can dynamically change connection itself of an internal function structure at the time of execution.

Means for Solving Problem

A signal processing device of the present invention is a signal processing device which executes signal processing indicated by an input data packet, comprising: a switching module which is provided in accordance with signal processing, and uses a routing table indicative of an input source of the data packet and an output destination where the next processing is performed to output the data packet input from the input source to the output destination for execution of processing, thereby controlling an order of signal processing; a processing module which is an input source and an output destination of the routing table, and executes processing indicated by the data packet with respect to the data packet transmitted from said switching module side to transmit the data packet to said switching module side; and a plurality of sets of input/output buffers which are connected with said switching module to buffer the data packet, the input buffer buffering a data packet which is input to said switching module side from an input source in the routing table, the output buffer buffering a data packet output to the output destination in the routing table from the switching module side, wherein said signal processing device is constituted by combining an arbitrary number of said switching modules with an arbitrary number of said processing modules through each set of said input/output buffers, at least one said switching module being connected with the outside of said signal processing device through corresponding said input/output buffers, the routing table being indicative of a burden share of signal processing in each said switching module and provided in accordance with each said switching module when the plurality of said switching modules are provided, said switching module executes routing processing of inputting a data packet from the outside of said signal processing device, said processing module or another switching module through a corresponding input buffer and outputting the data packet to an output destination based on the routing table corresponding to signal processing indicated by the data packet through a corresponding output buffer, said processing module executes processing indicated by a data packet transmitted from said switching module through a corresponding output buffer with respect to the data packet, and transmits the data packet to said switching module side through an input buffer which forms a set with the corresponding output buffer, and said another switching module executes routing processing with respect to a data packet transmitted from said switching module through a corresponding output buffer by using a routing table for said another switching module corresponding to signal processing indicated by the data packet, and transmits the data packet to said switching module side through an input buffer which forms a set with the corresponding output buffer.

Here, in the signal processing device of the present invention, wherein the data packet may include a data type indicative of a type of signal processing and signal data which is a target of signal processing, and said processing module executes processing corresponding to a data type with respect to signal data in an input data packet.

Here, in the signal processing device of the present invention, wherein the data packet further may include a state portion indicative of a state concerning a destination for the next processing of the data packet, said processing module executes processing corresponding to a data type with respect to signal data in an input data packet and performs a predetermined operation corresponding to the processing with respect to a value of the state portion, and the routing table is provided in accordance with a data type of a data packet in accordance with each said switching module, and indicative of at least one output destination where the data packet is processed next based on an input source of a data packet and a value of the state portion.

Here, in the signal processing device of the present invention, wherein said switching module may perform a predetermined operation with respect to a value of the state portion when outputting a data packet to said another switching module.

Here, in the signal processing device of the present invention, wherein a plurality of output buffers in the one set of said input/output buffers may be provided in accordance with each said processing module to be connected.

Here, in the signal processing device of the present invention, may comprise first and second said switching modules, the first said switching module being connected with the outside of said signal processing device and connected with a low-pass filter processing module which removes a high-frequency component of signal data included in an input data packet, wherein a state in the state portion indicates a number of times of processing executed in said processing module with respect to a data packet, said processing module executes processing corresponding to a data type with respect to signal data in an input data packet and adds 1 to a value of the state portion to output the data packet, said switching module adds 1 to a value of the state portion when outputting a data packet to said another switching module, and includes as a first said switching module routing table when a data type of an input data packet is indicative of picture demodulation processing in analog television broadcasting: one which indicates said second switching module as an output destination when an input source of a data packet is the outside of said signal processing device and a value of the state portion in the data packet is 0; one which indicates said low-pass filter processing module as an output destination when an input source of a data packet is said second switching module and a value of the state portion in the data packet is 5; and one which indicates the outside of said signal processing device as an output destination when an input source of a data packet is said low-pass filter processing module and a value of the state portion in the data packet is 6, said second switching module is connected with said first switching module and also connected with: a band-limiting filter processing module which performs band limiting of signal data included in an input data packet; a synchronous detection processing module which generates a signal synchronized with a carrier wave from signal data included in an input data packet; and a mixer processing module which mixes respective signals included in input two data packets, and includes as a second switching module routing table when a data type of an input data packet indicates picture demodulation processing in analog television broadcasting: one which indicates said band-limiting filter processing module as an output destination when an input source of a data packet is said first switching module and a value of the state portion in the data packet is 1; one which indicates said synchronous detection processing module and a first output buffer of two output buffers for said mixer processing module as output destinations when an input source of a data packet is said band-limiting filter processing module and a value of the state portion of the data packet is 2; one which indicates a second output buffer of two output buffers for said mixer processing module as an output destination when an input source of a data packet is said synchronous detection module and a value of the detection portion of the data packet is 3; and one which indicates said first switching module as an output destination when an input source of a data packet is said mixer processing module and a value of the state portion in the data packet is 4.

Here, in the signal processing device of the present invention, wherein, when a data type of a data packet input from the outside of said signal processing device indicates picture demodulation processing in analog television broadcast, based on the first or the second switching module routing table, said first switching module adds 1 to a value of the state portion in the data packet and outputs the data packet to said second switching module, said second switching module outputs the input data packet to said band-limiting filter processing module, said band-limiting filter processing module executes processing of the input data packet and sets the value of the state portion to 2 by adding 1 thereto to output the data packet to said second switching module, said second switching module outputs the input data packet to said synchronous detection processing module and the first output buffer of said mixer processing module, said synchronous detection processing module executes processing of the input data packet and sets the value of the state portion to 3 by adding 1 thereto to output the data packet to said second switching module, said second switching module outputs the input data packet to the second output buffer of said mixer processing module, said mixer processing module executes processing of the data packet input through the first output buffer and the second output buffer and sets the value of the state portion to 4 by adding 1 thereto to output the data packet to said second switching module, said second switching module sets the value of the state portion in the input data packet to 5 by adding 1 thereto and outputs the data packet to said second switching module, and said first switching module outputs the input data packet to said low-pass filter processing module, said low-pass filter processing module executes processing of the input data packet and sets the value of the state portion to 6 by adding 1 thereto to output the data packet to said first switching module, and said first switching module outputs the input data packet to the outside of said signal processing device.

Here, in the signal processing device of the present invention, may comprise first and second switching modules, said first switching module being connected with the outside of said signal processing device and connected with a low-pass filter processing module which removes a high-frequency component of signal data included in an input data packet, wherein a state in the state portion indicates a number of times of processing executed with respect to a data packet in said processing module, said processing module executes processing corresponding to a data type with respect to signal data of an input data packet, adds 1 to a value of the state portion and outputs the data packet, and said switching module adds 1 to the value of the state portion when outputting the data packet to another switching module, and includes as a first switching module routing table when a data type of an input data packet indicates audio demodulation processing in amplitude modulation radio broadcasting: one which indicates said second switching module as an output destination when an input source of a data packet is the outside of said signal processing device and a value of a state portion of the data packet is 0; one which indicates said low-pass filter processing module as an output destination when an input source of a data packet is said second switching module and a value of a state portion of the data packet is 4; and one which indicates the outside of said signal processing device as an output destination when an input source of a data packet is said low-pass filter processing module and a value of a state portion of the data packet is 5, said second switching module is connected with said first switching module and connected with: a synchronous detection processing module which generates a signal synchronized with a carrier wave from signal data included in an input data packet; and a mixer processing module which mixes respective signals included in input two data packets, and includes as a second switching module routing table when a data type of an input data packet indicates audio demodulation processing in amplitude modulation radio broadcasting: one which indicates said synchronous detection processing module and a first output buffer of two output buffers for said mixer processing module as output destinations when an input source of a data packet is said first switching module and a value of a state portion of the data packet is 1; one which indicates a second output buffer of the two output buffers for said mixer processing module as an output destination when an input source of a data packet is said synchronous detection processing module and a value of a state portion of the data packet is 2; and one which indicates said first switching module as an output destination when an input source of a data packet is said mixer processing module and a value of a state portion of the data packet is 3.

Here, in the signal processing device of the present invention, wherein when a data type of a data packet input from the outside of said signal processing device indicates audio demodulation processing in amplitude modulation radio broadcasting, based on the first or second switching module routing table, said first switching module sets a value of a state portion of the data packet to 2 by adding 1 thereto and outputs the data packet to said second switching module, said second switching module outputs the input data packet to said synchronous detection processing module and the first output buffer of said mixer processing module, said synchronous detection processing module executes processing of the input data packet and sets a value of the state portion to 2 by adding 1 thereto to output the data packet to said second switching module, said second switching module outputs the input data packet to the second output buffer of said mixer processing module, said mixer processing module executes processing of the data packet input through the first output buffer and the second output buffer and sets the value of the state portion to 3 by adding 1 thereto to output the data packet to said second switching module, and said second switching module sets the value of the state portion of the input data packet to 4 by adding 1 thereto and outputs the data packet to said second switching module, said first switching module outputs the input data packet to said low-pass filter processing module, said low-pass filter processing module executes processing of the input data packet and sets the value of the state portion to 5 by adding 1 thereto to output the data packet to said first switching module, and said first switching module outputs the input data packet to the outside of said signal processing device.

Here, in the signal processing device of the present invention, wherein said processing module may process and output an input data packet by using a parameter table for each processing module which indicates processing corresponding to the input data packet.

Here, in the signal processing device of the present invention, wherein a parameter packet which is input from the outside of said signal processing device and includes an identifier of a processing module and contents of the parameter table of said processing module may be transmitted to a processing module specified by the identifier based on predetermined conditions, thereby dynamically rewriting the contents of the parameter table.

Here, in the signal processing device of the present invention, wherein the identifier of said processing module may include an identifier of said switching module to which said processing module is connected and an internal identifier which identifies said processing module connected with said switching module and, under the predetermined conditions, the parameter packet is transmitted to a processing module having the same identifier as the internal identifier included in the parameter packet when an identifier of a switching module which has input the parameter packet matches with the identifier of said switching module included in the parameter packet.

Here, in the signal processing device of the present invention, wherein the parameter packet may be transmitted to switching modules sequentially connected with said switching module when the identifier of said switching module which has input the parameter packet does not match with the identifier of the switching module included in the parameter packet, and the parameter packet is erased when the sequentially connected switching modules do not exist.

Here, in the signal processing device of the present invention, wherein a packet including contents of the routing table of said switching module may be transmitted to the one or more switching modules, thereby dynamically rewriting the contents of the routing table.

A signal processing method of the present invention is a signal processing method which allows a signal processing device to execute signal processing indicated by an input data packet, the signal processing device comprising: a switching module which is provided in accordance with each signal processing and uses a routing table indicative of an input source of a data packet and an output destination where the next processing is executed to output a data packet input from the input source to the output destination, thereby controlling an order of signal processing; a processing module which is an input source and an output destination in the routing table and executes processing indicated by the data packet with respect to the data packet transmitted from the switching module side to transmit the data packet to the switching module side; and a plurality of sets of input/output buffers which are connected with the switching module and buffer a data packet, the input buffer buffering a data packet which is input from an input source in the routing table to the switching module side, the output buffer buffering a data packet which is output to an output destination in the routing table from the switching module side, the signal processing device being constituted by combining an arbitrary number of switching modules and processing modules through each set of input/output buffers, at least one switching module being connected with the outside of the signal processing device through corresponding input/output buffers, the routing table being indicative of a burden share of signal processing in each switching module and provided in accordance with each switching module when the plurality of switching modules are provided, the signal processing method comprising: a routing step at which the switching module inputs a data packet from the outside of the signal processing device, the processing module or another switching module through a corresponding input buffer and outputs the data packet to an output destination based on the routing table corresponding to signal processing indicated by the data packet through a corresponding output buffer; a processing module step at which, when an output destination at said routing step is the processing module, the processing module executes processing indicated by a data packet transmitted from the switching module through a corresponding output buffer with respect to the data packet and transmits the data packet to the switching module side through an input buffer which forms a set with the corresponding output buffer; and another switching module step at which, when an output destination at said routing step is another switching module different from the switching module, another switching module uses a routing table for another switching module corresponding to signal processing indicated by a data packet transmitted from the switching module through a corresponding output buffer to execute routing processing with respect to the data packet and transmits the data packet to the switching module side through an input buffer which forms a set with the corresponding output buffer.

Here, in the signal processing method of the present invention, wherein the data packet may include a data type indicative of a type of signal processing and signal data which is a target of signal processing, and when the switching module is connected with the processing module, it inputs a data packet in which the signal data of the output data packet is executed processing corresponding to the data type by the processing module.

Here, in the signal processing method of the present invention, wherein the data packet may further include a state portion indicative of a state concerning a destination for the next processing of the data packet, it inputs a data packet in which the signal data of the output data packet is executed processing corresponding to the data type by the processing module, and the value of the state portion is processed a predetermined operation corresponding to the processing by the processing module, and the routing table is provided in accordance with a data type of a data packet in accordance with each switching module, and indicative of at least one output destination where the data packet is processed next based on an input source of a data packet and a value of the state portion.

Here, in the signal processing method of the present invention, when the output destination in said routing step may be another switching module, further comprising the step of performing a predetermined operation with respect to a value of the state portion of the input data packet.

Here, in the signal processing method of the present invention, wherein a plurality of output buffers in the one set of said input/output buffers may be provided in accordance with each said processing module to be connected.

Here, in the signal processing method of the present invention, the signal processing device may comprise first and second the switching modules, the first the switching module being connected with the outside of the signal processing device and connected with a low-pass filter processing module which removes a high-frequency component of signal data included in an input data packet, wherein a state in the state portion indicates a number of times of processing executed in the processing module with respect to a data packet, the processing module executes processing corresponding to a data type with respect to signal data in an input data packet and adds 1 to a value of the state portion to output the data packet, the switching module adds 1 to a value of the state portion when outputting a data packet to the another switching module, and includes as a first the switching module routing table when a data type of an input data packet is indicative of picture demodulation processing in analog television broadcasting: one which indicates the second switching module as an output destination when an input source of a data packet is the outside of the signal processing device and a value of the state portion in the data packet is 0; one which indicates the low-pass filter processing module as an output destination when an input source of a data packet is the second switching module and a value of the state portion in the data packet is 5; and one which indicates the outside of the signal processing device as an output destination when an input source of a data packet is the low-pass filter processing module and a value of the state portion in the data packet is 6, the second switching module is connected with the first switching module and also connected with: a band-limiting filter processing module which performs band limiting of signal data included in an input data packet; a synchronous detection processing module which generates a signal synchronized with a carrier wave from signal data included in an input data packet; and a mixer processing module which mixes respective signals included in input two data packets, and includes as a second switching module routing table when a data type of an input data packet indicates picture demodulation processing in analog television broadcasting: one which indicates the band-limiting filter processing module as an output destination when an input source of a data packet is the first switching module and a value of the state portion in the data packet is 1; one which indicates the synchronous detection processing module and a first output buffer of two output buffers for the mixer processing module as output destinations when an input source of a data packet is the band-limiting filter processing module and a value of the state portion of the data packet is 2; one which indicates a second output buffer of two output buffers for the mixer processing module as an output destination when an input source of a data packet is the synchronous detection module and a value of the detection portion of the data packet is 3; and one which indicates the first switching module as an output destination when an input source of a data packet is the mixer processing module and a value of the state portion in the data packet is 4.

Here, in the signal processing method of the present invention, wherein, when a data type of a data packet input from the outside of said signal processing device is indicate picture demodulation processing in analog television broadcast, based on the first or the second switching module routing table, comprising: a step at which the first switching module adds 1 to a value of the state portion in the data packet and outputs the data packet to the second switching module; a step at which the second switching module outputs the input data packet to the band-limiting filter processing module; a step at which the band-limiting filter processing module executes processing of the input data packet and sets the value of the state portion to 2 by adding 1 thereto to output the data packet to the second switching module; a step at which the second switching module outputs the input data packet to the synchronous detection processing module and the first output buffer of the mixer processing module; a step at which the synchronous detection processing module executes processing of the input data packet and sets the value of the state portion to 3 by adding 1 thereto to output the data packet to the second switching module; a step at which the second switching module outputs the input data packet to the second output buffer of the mixer processing module; a step at which the mixer processing module executes processing of the data packet input through the first output buffer and the second output buffer and sets the value of the state portion to 4 by adding 1 thereto to output the data packet to the second switching module; a step at which the second switching module sets the value of the state portion in the input data packet to 5 by adding 1 thereto and outputs the data packet to the second switching module; a step at which the first switching module outputs the input data packet to the low-pass filter processing module; a step at which the low-pass filter processing module executes processing of the input data packet and sets the value of the state portion to 6 by adding 1 thereto to output the data packet to the first switching module; and a step at which the first switching module outputs the input data packet to the outside of the signal processing device.

Here, in the signal processing method of the present invention, the signal processing device may comprise first and second switching modules, the first switching module being connected with the outside of the signal processing device and connected with a low-pass filter processing module which removes a high-frequency component of signal data included in an input data packet, wherein a state in the state portion indicates a number of times of processing executed with respect to a data packet in the processing module, the processing module executes processing corresponding to a data type with respect to signal data of an input data packet, adds 1 to a value of the state portion and outputs the data packet, and the switching module adds 1 to the value of the state portion when outputting the data packet to another switching module, and includes as a first switching module routing table when a data type of an input data packet indicates audio demodulation processing in amplitude modulation radio broadcasting: one which indicates the second switching module as an output destination when an input source of a data packet is the outside of the signal processing device and a value of a state portion of the data packet is 0; one which indicates the low-pass filter processing module as an output destination when an input source of a data packet is the second switching module and a value of a state portion of the data packet is 4; and one which indicates the outside of the signal processing device as an output destination when an input source of a data packet is the low-pass filter processing module and a value of a state portion of the data packet is 5, the second switching module is connected with the first switching module and connected with: a synchronous detection processing module which generates a signal synchronized with a carrier wave from signal data included in an input data packet; and a mixer processing module which mixes respective signals included in input two data packets, and includes as a second switching module routing table when a data type of an input data packet indicates audio demodulation processing in amplitude modulation radio broadcasting: one which indicates the synchronous detection processing module and a first output buffer of two output buffers for the mixer processing module as output destinations when an input source of a data packet is the first switching module and a value of a state portion of the data packet is 1; one which indicates a second output buffer of the two output buffers for the mixer processing module as an output destination when an input source of a data packet is the synchronous detection processing module and a value of a state portion of the data packet is 2; and one which indicates the first switching module as an output destination when an input source of a data packet is the mixer processing module and a value of a state portion of the data packet is 3.

Here, in the signal processing method of the present invention, wherein when a data type of a data packet input from the outside of the signal processing device indicates audio demodulation processing in amplitude modulation radio broadcasting, based on the first or second switching module routing table, a step at which the first switching module sets a value of a state portion of the data packet to 2 by adding 1 thereto and outputs the data packet to the second switching module; a step at which the second switching module outputs the input data packet to the synchronous detection processing module and the first output buffer of the mixer processing module; a step at which the synchronous detection processing module executes processing of the input data packet and sets a value of the state portion to 2 by adding 1 thereto to output the data packet to the second switching module; a step at which the second switching module outputs the input data packet to the second output buffer of the mixer processing module; a step at which the mixer processing module executes processing of the data packet input through the first output buffer and the second output buffer and sets the value of the state portion to 3 by adding 1 thereto to output the data packet to the second switching module; a step at which the second switching module sets the value of the state portion of the input data packet to 4 by adding 1 thereto and outputs the data packet to the second switching module; a step at which the first switching module outputs the input data packet to the low-pass filter processing module; a step at which the low-pass filter processing module executes processing of the input data packet and sets the value of the state portion to 5 by adding 1 thereto to output the data packet to the first switching module; and a step at which the first switching module outputs the input data packet to the outside of the signal processing device.

Here, in the signal processing method of the present invention, when the switching module is connected to the processing module, the processing of data packet in the processing module is using a parameter table for each processing module which indicates processing corresponding to the input data packet.

Here, in the signal processing method of the present invention, wherein the signal processing device may input a parameter packet which includes an identifier of a processing module and contents of the parameter table of the processing module from the outside of the signal processing device and transmits it to a processing module specified by the identifier based on predetermined conditions, thereby dynamically rewrites the contents of the parameter table.

Here, in the signal processing method of the present invention, wherein the identifier of the processing module may include an identifier of the switching module to which the processing module is connected and an internal identifier which identifies the processing module connected with the switching module and, under the predetermined conditions, the parameter packet is transmitted to a processing module having the same identifier as the internal identifier included in the parameter packet when an identifier of a switching module which has input the parameter packet matches with the identifier of the switching module included in the parameter packet.

Here, in the signal processing method of the present invention, wherein the parameter packet may be transmitted to switching modules sequentially connected with the switching module when the identifier of the switching module which has input the parameter packet does not match with the identifier of the switching module included in the parameter packet, and the parameter packet is erased when the sequentially connected switching modules do not exist.

Here, in the signal processing method of the present invention, wherein a packet including contents of the routing table of the switching module may be transmitted to the one or more switching modules, thereby dynamically rewriting the contents of the routing table.

A signal processing program of the present invention is a signal processing program which allows a computer of a switching module of a signal processing device to execute signal processing indicated by an input data packet, wherein the switching module is provided in accordance with each signal processing and uses a routing table indicative of an input source of a data packet and an output destination where the next processing is executed to output the data packet input from the input source to the output destination for execution of processing, thereby controlling an order of signal processing, the signal processing device comprises: a processing module which is an input source and an output destination in the routing table, executes processing indicated by a data packet transmitted from the switching module side with respect to the data packet and transmits the data packet to the switching module side; and a plurality of sets of input/output buffers which are connected with the switching module and buffer a data packet, the input buffer buffering a data packet which is input from an input source in the routing table to the switching module side, the output buffer buffering a data packet which is output to an output destination in the routing table from the switching module side, the signal processing device is constituted by combining an arbitrary number of switching modules and processing modules through each set of input/output buffers, at least one switching module is connected with the outside of the signal processing device through corresponding input/output buffers, and the routing table is indicative of a burden share of signal processing in each switching module and provided in accordance with each switching module when the plurality of switching modules are provided, the signal processing program allows the computer of the switching module to execute a routing step of executing routing processing which inputs a data packet from the outside of the signal processing device, the processing module or another switching module through a corresponding input buffer and outputs the data packet to an output destination based on the routing table corresponding to signal processing indicated by the data packet through a corresponding output buffer, when an output destination at said routing step is the processing module, to execute processing indicated by a data packet transmitted from the switching module through an output buffer with respect to the data packet and output the data packet to the switching module side through an input buffer which forms a set with the corresponding output buffer and when an output destination at said routing step is another switching module different from the switching module, the another switching module is allowed to execute routing processing with respect to a data packet transmitted from the switching module through a corresponding output buffer by using the routing table for another switching module corresponding to signal processing indicated by the data packet and transmit the data packet to the switching module side through an input buffer which forms a set with the corresponding output buffer.

Here, in the signal processing program of the present invention, wherein the data packet may include a data type indicative of a type of signal processing and signal data which is a target of signal processing, and when the switching module is connected with the processing module, it inputs a data packet in which the signal data of the output data packet is executed processing corresponding to the data type by the processing module.

Here, in the signal processing program of the present invention, wherein the data packet may further include a state portion indicative of a state concerning a destination for the next processing of the data packet, it inputs a data packet in which the signal data of the output data packet is executed processing corresponding to the data type by the processing module, and the value of the state portion is processed a predetermined operation corresponding to the processing by the processing module, and the routing table is provided in accordance with a data type of a data packet in accordance with each switching module, and indicative of at least one output destination where the data packet is processed next based on an input source of a data packet and a value of the state portion.

Here, in the signal processing program of the present invention, when the output destination in said routing step may be another switching module, further comprising the step of performing a predetermined operation with respect to a value of the state portion of the input data packet.

Here, in the signal processing program of the present invention, wherein a plurality of output buffers in the one set of said input/output buffers may be provided in accordance with each said processing module to be connected.

Here, in the signal processing program of the present invention, the signal processing device may comprise first and second the switching modules, the first the switching module being connected with the outside of the signal processing device and connected with a low-pass filter processing module which removes a high-frequency component of signal data included in an input data packet, wherein a state in the state portion indicates a number of times of processing executed in the processing module with respect to a data packet, the processing module executes processing corresponding to a data type with respect to signal data in an input data packet and adds 1 to a value of the state portion to output the data packet, the switching module adds 1 to a value of the state portion when outputting a data packet to the another switching module, and includes as a first the switching module routing table when a data type of an input data packet is indicative of picture demodulation processing in analog television broadcasting: one which indicates the second switching module as an output destination when an input source of a data packet is the outside of the signal processing device and a value of the state portion in the data packet is 0; one which indicates the low-pass filter processing module as an output destination when an input source of a data packet is the second switching module and a value of the state portion in the data packet is 5; and one which indicates the outside of the signal processing device as an output destination when an input source of a data packet is the low-pass filter processing module and a value of the state portion in the data packet is 6, the second switching module is connected with the first switching module and also connected with: a band-limiting filter processing module which performs band limiting of signal data included in an input data packet; a synchronous detection processing module which generates a signal synchronized with a carrier wave from signal data included in an input data packet; and a mixer processing module which mixes respective signals included in input two data packets, and includes as a second switching module routing table when a data type of an input data packet indicates picture demodulation processing in analog television broadcasting: one which indicates the band-limiting filter processing module as an output destination when an input source of a data packet is the first switching module and a value of the state portion in the data packet is 1; one which indicates the synchronous detection processing module and a first output buffer of two output buffers for the mixer processing module as output destinations when an input source of a data packet is the band-limiting filter processing module and a value of the state portion of the data packet is 2; one which indicates a second output buffer of two output buffers for the mixer processing module as an output destination when an input source of a data packet is the synchronous detection module and a value of the detection portion of the data packet is 3; and one which indicates the first switching module as an output destination when an input source of a data packet is the mixer processing module and a value of the state portion in the data packet is 4.

Here, in the signal processing program of the present invention, wherein, when a data type of a data packet input from the outside of said signal processing device indicates picture demodulation processing in analog television broadcast, based on the first or the second switching module routing table, comprising: a step at which the first switching module adds 1 to a value of the state portion in the data packet and outputs the data packet to the second switching module; a step at which the second switching module outputs the input data packet to the band-limiting filter processing module; a step at which the second switching module inputs the data packet which is input and executed processing and set the value of the state portion to 2 by adding 1 thereto by the band-limiting filter processing module; a step at which the second switching module outputs the input data packet to the synchronous detection processing module and the first output buffer of the mixer processing module; a step at which the second switching module inputs the data packet which is input and executed processing and set the value of the state portion to 3 by adding 1 thereto by the synchronous detection processing module; a step at which the second switching module outputs the input data packet to the second output buffer of the mixer processing module; a step at which the second switching module inputs the data packet which is input through the first output buffer and the second output buffer and executed processing and set the value of the state portion to 4 by adding 1 thereto by the mixer processing module; a step at which the second switching module sets the value of the state portion in the input data packet to 5 by adding 1 thereto and outputs the data packet to the second switching module; a step at which the first switching module outputs the input data packet to the low-pass filter processing module; a step at which the first switching module inputs the data packet which is input and executed processing and set the value of the state portion to 6 by adding 1 thereto by the low-pass filter processing module; a step at which the first, switching module outputs the input data packet to the outside of the signal processing device.

Here, in the signal processing program of the present invention, the signal processing device may comprise first and second switching modules, the first switching module being connected with the outside of the signal processing device and connected with a low-pass filter processing module which removes a high-frequency component of signal data included in an input data packet, wherein a state in the state portion indicates a number of times of processing executed with respect to a data packet in the processing module, the processing module executes processing corresponding to a data type with respect to signal data of an input data packet, adds 1 to a value of the state portion and outputs the data packet, and the switching module adds 1 to the value of the state portion when outputting the data packet to another switching module, and includes as a first switching module routing table when a data type of an input data packet indicates audio demodulation processing in amplitude modulation radio broadcasting: one which indicates the second switching module as an output destination when an input source of a data packet is the outside of the signal processing device and a value of a state portion of the data packet is 0; one which indicates the low-pass filter processing module as an output destination when an input source of a data packet is the second switching module and a value of a state portion of the data packet is 4; and one which indicates the outside of the signal processing device as an output destination when an input source of a data packet is the low-pass filter processing module and a value of a state portion of the data packet is 5, the second switching module is connected with the first switching module and connected with: a synchronous detection processing module which generates a signal synchronized with a carrier wave from signal data included in an input data packet; and a mixer processing module which mixes respective signals included in input two data packets, and includes as a second switching module routing table when a data type of an input data packet indicates audio demodulation processing in amplitude modulation radio broadcasting: one which indicates the synchronous detection processing module and a first output buffer of two output buffers for the mixer processing module as output destinations when an input source of a data packet is the first switching module and a value of a state portion of the data packet is 1; one which indicates a second output buffer of the two output buffers for the mixer processing module as an output destination when an input source of a data packet is the synchronous detection processing module and a value of a state portion of the data packet is 2; and one which indicates the first switching module as an output destination when an input source of a data packet is the mixer processing module and a value of a state portion of the data packet is 3.

Here, in the signal processing program of the present invention, wherein when a data type of a data packet input from the outside of the signal processing device indicates audio demodulation processing in amplitude modulation radio broadcasting, based on the first or second switching module routing table, a step at which the first switching module sets a value of a state portion of the data packet to 2 by adding 1 thereto and outputs the data packet to the second switching module; a step at which the second switching module outputs the input data packet to the synchronous detection processing module and the first output buffer of the mixer processing module; a step at which the second switching module inputs the data packet which is input and executed processing and set a value of the state portion to 2 by adding 1 thereto by the synchronous detection processing module; a step at which the second switching module outputs the input data packet to the second output buffer of the mixer processing module; a step at which the second switching module inputs the data packet which is input through the first output buffer and the second output buffer and executed processing and set a value of the state portion to 3 by adding 1 thereto by the mixer processing module; a step at which the second switching module sets the value of the state portion of the input data packet to 4 by adding 1 thereto and outputs the data packet to the second switching module; a step at which the first switching module outputs the input data packet to the low-pass filter processing module; a step at which the first switching module inputs the data packet which is input and executed processing and set a value of the state portion to 5 by adding 1 thereto by the low-pass filter processing module; a step at which the first switching module outputs the input data packet to the outside of the signal processing device.

A recording medium of the present invention is a computer-readable recording medium that records the signal processing program according to any one of the present invention.

EFFECT OF THE INVENTION

According to a signal processing device or the like of the present invention, in a switching module which controls an order of signal processing of the data packets, a plurality of routing tables indicative of routing destinations of data packets according to signal processing can be prepared. The switching module can select and use a necessary routing table in accordance with each data packet input thereto at the time of execution. Therefore, for a processing module which is physically connected with the switching module or the like and performs processing corresponding to each data packet, in accordance with each data packet input thereto, i.e., in accordance with a routing table to be used, connection of the processing module can be dynamically changed. Since the signal processing device can be used as a signal processing section of a software radio device or the like, according to the signal processing device or the like of the present invention, there can be obtained an effect of providing a signal processing section of the software radio device or the like which can dynamically change connection itself of a function structure of, e.g., an internal processing module at the time of execution.

BEST MODE FOR CARRYING OUT THE INVENTION

Each embodiment will now be described in detail hereinafter with reference to the accompanying drawings.

Embodiment 1

FIG. 1 shows a signal processing device 1 in Embodiment 1 according to the present invention. In FIG. 1, reference numeral 10 denotes an I/O section having a function of inputting/outputting a data packet with respect to the outside of the signal processing device 1; 20, a switching module ISM1 which is connected with the I/O section 10 and controls an order of signal processing; 11, a processing module a as one processing module which is connected with the switching module ISM1 (20) and performs various kinds of processing with respect to each data packet; and 15, a processing module b which is connected with the switching module ISM1 (20). As shown in FIG. 1, between the I/O section 10 and the switching module ISM1 (20) are connected by data packet paths pd1 (an outline arrow) and pd2 (a black arrow), and between the switching module ISM1 (20) and the processing module a11 or the like are connected by data packet paths pd3 and pd4 (a black arrow). For the convenience's sake, although other paths (indicated by an outline arrow and a black arrow) are not denoted by reference numerals, every path is a data packet path. As various kinds of processing of the processing module a11 or the like, there is, e.g., filter processing. In this Embodiment 1, specific processing is not clearly indicated in relation to the processing module a11 or the like, and a description will be given as to a case where specific processing is executed in Embodiments 2 and 3 (which will be explained later). Another switching module ISM2 (30) is connected with the switching module ISM1 (20) through an interface (I/F) 18. Processing modules c12, d13 and e14 are connected with the switching module ISM2 (30). However, since processing is not allocated to the processing module c12 in a routing table 61 (which will be described later) in the example shown in FIG. 1, it is shown that this module is in a Not Assigned (N/A) condition. In FIG. 1, the signal processing device 1 is constituted of a combination of the two switching modules ISM1 (20) and ISM2 (30) and the four processing modules a11 or the like (excluding the processing module c12), but this configuration is shown for the convenience's sake, and the signal processing device 1 can be constituted of a combination of an arbitrary number of the switching modules ISM1 (20) or the like and an arbitrary number of processing modules a11 or the like. That is, the number of processing modules a11 or the like and I/F 18 or the like connected to one switching module ISM1 (20) is not restricted to four. Further, the number of processing modules a11 or the like and the I/F 18 or the like to be connected can be changed in accordance with each switching module ISM1 (20). It is to be noted that the I/O section 10 is not included in the signal processing device 1 in a narrow sense, and the switching module ISM1 (20) is a switching module connected with the outside. The above described switching modules ISM1 (20) and ISM2 (30) are provided in accordance with signal processing indicated by each data packet, and use respective routing tables 60 and 61 indicative of an input source of a data packet and an output destination where the next processing is executed (e.g., the I/O section 10, the processing module a11 or the like, or another switching module ISM2 (30) and others) to output the data packet input from the input source to the output destination for processing, thereby controlling an order of signal processing. The processing module a11 or the like which is an input source and an output destination of the routing table 60 or the like performs processing indicated by a data packet with respect to this data packet supplied from the switching module ISM1 (20) side or the like, and transmits this data packet to the switching module ISM1 (20) or the like.

As shown in FIG. 1, a plurality of sets of input/output buffers which perform buffering of each data packet are connected with the switching module ISM1 (20) or the like. The input buffer buffers a data packet input to the switching module ISM1 (20) side or the like from an input source in the routing table 60 or the like, and the output buffer buffers a data packet output from the switching module ISM1 (20) side or the like to an output destination in the routing table 60 or the like. For example, between the switching module ISM1 (20) and the processing module a11, an input buffer 21a and an output buffer 21b (in case of representing both buffers, they are referred to as "input/output buffers 21", this is applied to the following description) as one set of input/output buffers are connected. In FIG. 1, the input buffer 21a has one block (although its capacity is arbitrary, it is determined that one block has a capacity corresponding to at least one data packet), and the output buffer 21b has four blocks. However, this is just an example, and the output buffer 21b or the like can have an arbitrary number of blocks. When the input buffer 21a or the like has one block, necessary conditions are satisfied, but the input buffer 21a may have one or an arbitrary number of blocks. When the buffer has a plurality of blocks, each data packet is controlled based on First-In First-Out (FIFO). An input buffer 22a and an output buffer 22b as one set of input/output buffers 22 are connected between the switching module ISM1 (20) and the switching module ISM2 (30), an input buffer 23a and an output buffer 23b as one set of input/output buffers 23 are connected between the switching module ISM1 (20) and the processing module b15, and an input buffer 24a and an output buffer 24b as one set of input/output buffers 24 are connected between the switching module ISM1 (20) and the I/O section 10. Giving a description on a direction of input/output of a data packet by using, e.g., one set of input/output buffers 21, it can be considered that the output buffer 21b buffers a data packet which is output to an output destination such as a processing module a11 or the like from the switching module ISM1 (20) and the input buffer 21a buffers a data packet which is input to the switching module ISM1 (20) side from an input source (the output destination) such as a processing module a11 or the like. This considers that the data packet is input/output with the switching module ISM1 (20) or the like at the center, but the data packet may be input/output with the processing module a11 or the like at the center. In the latter case, names of the input/output buffers are counterchanged. It is determined that a data packet is input/output with the switching module ISM1 (20) or the like at the center like the former case in this specification and claims.

As shown in FIG. 1, a plurality of sets of input/output buffers are also connected to the switching module ISM2 (30) or the like. An input buffer 32a and an output buffer 32b as one set of input/output buffers 32 are connected between the switching module ISM2 (30) and the processing module d13, an input buffer 33a and two output buffers 33b-1 (an input 1 on the processing module e14 side) and 33b-2 (an input 2 on the processing module e14 side) as one set of input/output buffers 33 are connected between the switching module ISM2

(30) and the processing module e14, and an input buffer 34a and an output buffer 34b as one set of input/output buffers 34 are connected between the switching module ISM2 (30) and the switching module ISM1 (20). Although an input buffer 31a and an output buffer 31b as one set of input/output buffers 31 are prepared between the switching module ISM2 (30) and the processing module c12, the N/A condition is set in processing of the routing table 61 as described above, and hence these buffers are not used. Like the output buffers 33b-1 and 33b-2 in one set of the input/output buffers 33 between the switching module ISM2 (30) and the processing module e14, a plurality of output buffers may be provided in accordance with a processing module to be connected.

The signal processing device 1 can be constituted by combining an arbitrary number of switching modules ISM1 (20) or the like and an arbitrary number of processing modules a11 or the like through each corresponding set of input/output buffers 21 or the like. In this case, at least one switching module, e.g., ISM1 (20) is connected with the outside (the I/O section 10) of the signal processing device 1 through the input/output buffers 24. When the signal processing device 1 has the plurality of switching modules ISM1 (20) or the like, the routing table 60 or the like indicative of a burden share of specific signal processing in each switching module ISM1 (20) or the like when performing this signal processing represented by an input data packet is provided in accordance with each switching module ISM1 (20) or the like.

The switching module ISM1 (20) or the like inputs a data packet from the outside (the I/O section 10) of the signal processing device 1, the processing module a11 or another switching module ISM2 (30) through each corresponding input buffer 24, 21 or 22. Then, it selects the routing table 60 or the like corresponding to signal processing indicated by this data packet, obtains an output destination based on this routing table 60 or the like, and executes routing processing of outputting the data packet to this output destination through the corresponding output buffer 21b or the like.

The processing module a11 or the like receives the data packet transmitted from the switching module ISM1 (20) or the like through the corresponding output buffer 21b or the like. Subsequently, it performs processing indicated by the data packet with respect to this data packet. Then, it transmits this data packet to the switching module ISM1 (20) side through the input buffer 21a which forms one set with the corresponding output buffer 21b or the like.

Another switching module ISM2 (30) or the like receives the data packet transmitted from the switching module ISM1 (20) or the like through the corresponding output buffer 22b or the like. Then, it performs the above-described routing processing to the data packet by using the routing table 61 or the like for another switching module ISM2 (30) corresponding to signal processing indicated by this data packet. That is, like the switching module ISM1 (20), the switching module ISM2 (30) also inputs a data packet from the processing module d13 or the like or the switching module ISM1 (20) or ISM 3 (not shown) which is another module for the switching module ISM2(20) through each corresponding input buffer 32, 34 or the like. Subsequently, it selects the routing table 61 or the like corresponding to signal processing indicated by this data packet, obtains an output destination based on this routing table 61 or the like, and executes routing processing of outputting the data packet to the output destination through the corresponding output buffer 32b or the like. Thereafter, it transmits this data packet to the switching module ISM1 (20) side through the input buffer 22a which forms one set with the corresponding output buffer 22b.

A data packet processed in the signal processing device 1 will now be described. FIG. 2 shows a structural example of a data packet. In FIG. 2, reference numeral 40 denotes an entire data packet; 42, signal data as a target of signal processing in the processing module a11 or the like; 46, a data type indicative of a type of signal processing performed with respect to the signal data 42 in the processing module a11 or the like; and 44, a state portion indicative of a state of the data packet 40. As a state of the data packet 40, the number of times of processing executed with respect to the data packet 40 in the processing module a11 or the like can be used, for example. Alternatively, as a state of the data packet 40, it is possible to use a value which means an output destination where the next processing corresponding to the processing executed in the processing module a11 or the like. In the following description, the number of times of processing executed with respect to the data packet 40 in the processing module a11 or the like is adopted as a state of the data packet 40 and, in this case, a processing portion 44 is called as processing counter portion 44 in particular. As types of signal processing indicated by the data type 46, there are, e.g., demodulation processing of FM (Frequency Modulation) radio broadcasting, demodulation processing of AM (Amplitude Modulation) radio broadcasting, a picture demodulation processing of analog television (TV) broadcasting and others. A combination of the data type 46 and the processing counter portion 44 is called a tag (or a header) 45. Reference numeral 48 denotes a valid/invalid bit indicating whether data of the signal data 42 is valid or invalid. The valid/invalid bit 48 may not be provided, and the data packet 40 is basically constituted of the signal data 42 and the tag 45. As shown in FIG. 2, a size of the entire data packet 40 can be set to 20 bits and, as a size of each portion, the signal data 42 can be set to 12 bits, the processing counter portion 44 can be set to 5 bits, the data type 46 can be set to two bits, and the valid/invalid bit can be set to one bit. However, the size of the entire data packet 40 and the size of each portion can be arbitrarily determined. The processing module a11 or the like executes signal processing corresponding to the data type 46 with respect to the signal data 42 of the input data packet 40, adds 1 to a value of the processing counter portion 44, and outputs the data packet 40 to the switching module ISM1 (20) or the like. The switching module ISM1 (20) or the like adds 1 to a value of the processing counter portion 44 when outputting the data packet 40 to another switching module ISM2 (30) or the like.

The routing table 60 or the like will now be described. The plurality of routing tables 60 or the like can be provided in accordance with the data type 46 in the data packet 40 for each switching module ISM1 (20) or the like. The switching module ISM1 (20) or the like can select and use the necessary routing table 60 or the like which is used by the switching module ISM1 (20) or the like by making reference to the data type 46 of the tag 45 with respect to the input data packet 40. The routing table 60 or the like indicates an output destination where the data packet 40 is processed next based on an input source of the data packet 40 and a value of the processing counter portion 44 of the tag 45 in the data packet 40. The number of output destinations may be not smaller than one. The switching module ISM1 (20) or the like determines an output destination of the data packet 40 based on the routing table 60 or the like and the processing counter portion 44 of the tag 45. That is, the switching module ISM1 (20) or the like makes reference to the tag 45 in the input data packet 40 to perform routing of the data packet 40.

FIG. 3(A) shows the routing table 60 which is used by the switching module ISM1 (20) in Embodiment 1. As shown in FIG. 3(A), the routing table 60 can be implemented by a tabular form in which a column expresses an input source and a row expresses an output destination. As the input sources, there are four columns from a column c1 to a column c4, and the column c1 represents the I/O section 10; the column c2, the processing module a11; the column c3, the processing module b15; and the column c4, another switching module ISM2 (30). As the output destinations, there are four rows from a row r1 to a row r4, and the row r1 represents the I/O section 10; the row r2, the processing module a11; the row r3, the processing module b15; and the row r4, another switching module ISM2 (30). Each numerical character in the table expresses a value of the processing counter portion 44.

How the switching module ISM1 (20) uses the routing table 60 will now be described. It is assumed that, when the switching module ISM1 (20) inputs the data packet 40, an input source of the data packet 40 is the I/O section 10 and a value of the processing counter portion 44 is 0. The switching module ISM1 (20) makes reference to the column c1 since the input source is the I/O section 10, and retrieves a row whose value is equal to the value (=0) of the processing counter portion 44 in the column c1. In the example of the routing table 60 shown in FIG. 3(A), since this row is the row r2 and the row r2 corresponds to the processing module a11, the switching module ISM1 (20) determines the processing module a11 as an output destination of the data packet 40, and transmits the data packet 40 to the output buffer 21b between itself and the processing module a11. The processing module a11 executes processing of the data packet 40, adds 1 to the value of the processing counter portion 44 to set the value to 1, and transmits the data packet 40 to the input buffer 21a which forms a pair with the output buffer 21b.

Then, the switching module ISM1 (20) makes reference to the column c2 since an input source of the data packet 40 is the processing module a11, and retrieves a row whose value is 1 in the column c2 because the value of the processing counter portion 44 in the data packet 40 is 1. In the example of the routing table 60 shown in FIG. 3(A), since this row is the row r3 and the row r3 corresponds to the processing module b15, the switching module ISM1 (20) determines the processing module b15 as an output destination of the data packet 40 and transmits the data packet 40 to the output buffer 23b between itself and the processing module b15. The processing module b15 executes processing of the data packet 40, adds 1 to the value of the processing counter portion 44 to set the value to 2, and transmits the data packet 40 to the input buffer 23a which forms a pair with the output buffer 23b.

Subsequently, the switching module ISM1 (20) makes reference to the column c3 since an input source of the data packet 40 is the processing module b15, and retrieves a row whose value is 2 in the column c3 because the value of the processing counter portion 44 in the data packet 40 is 2. In the example of the routing table 60 shown in FIG. 3(A), since this row is the row r4 and the row r4 corresponds to another switching module ISM2 (30), the switching module ISM1 (20) determines the switching module ISM2 (30) as an output destination of the data packet 40. The switching module ISM1 (20) adds 1 to the value of the processing counter portion 44 in the data packet 40 to set the value to 3, and then transmits the data packet 40 to the output buffer 22b between itself and the switching module ISM2 (30).

The switching module ISM2 (30) inputs the data packet 40 via the I/F 18 and the input buffer 34a. FIG. 3(B) shows the routing table 61 which is used by the switching module ISM2 (30) in Embodiment 1 according to the present invention. As shown in FIG. 3(B), there four columns from a column c1 to a column c4 as input sources in the routing table 61, and the column c1 represents the switching module ISM1 (20); the column c2, the processing module c12 (the N/A state); the column c3, the processing module d13; and the column c4, the processing module e14. There are five rows from a row r1 to a row r5 as output destinations, and the row r1 represents the switching module ISM1 (20); the row r2, the processing module c12 (the N/A state); the row r3, the processing module d13; the row r4, the processing module e14 (an input 1); and the row r5, the processing module e14 (an input 2). As shown in the routing table 61 of FIG. 3(B), since the processing module c12 of the column c2 and the row r2 is not allocated as both the input source and the output destination, it can be understood that it is in the N/A state. Since the processing module e14 executes processing based on two inputs (the inputs 1 and 2), two output destinations are provided in the routing table 61. The switching module ISM2 (30) uses this routing table 61 to carry out processing of the data packet 40.

The switching module ISM2 (30) makes reference to the column c1 since an input source of the data packet 40 is the switching module ISM1 (20), and retrieves a row whose value is 3 in the column c3 because the value of the processing counter portion 44 in the data packet 40 is 3. In the example of the routing table 61 depicted in FIG. 3(B), this row is the row r3 and the row r4, and the row r3 corresponds to the processing module d13 whilst the row r4 corresponds to the processing module e14 (the input 1). Therefore, the switching module ISM2 (30) determines the processing module d13 and the processing module e14 (the input 1) as output destinations of the data packet 40, and transmits the data packet 40 to the output buffer 32b between itself and the processing module d13 and the output buffer 33b-1 (the input 1) between itself and the processing module e14. Transfer of the data packet 40 to the two output buffers 32b and 33b-1 is performed in parallel. The processing module d13 executes processing of the data packet 40, adds 1 to the value of the processing counter portion 44 to set the value to 4, and transmits the data packet 40 to the input buffer 32a which forms a pair with the output buffer 32b. On the other hand, since the processing module e14 executes processing based on the two inputs as described above, it keeps the processing in a waiting mode until the data packet 40 (the value of the processing counter portion 44>3) arrives at the output buffer 33b-2 (the input 2).

Then, the switching module ISM2 (30) makes reference to the column c3 since an input source of the data packet 40 is the processing module d13, and retrieves a row whose value is 4 in the column c3 because the value of the processing counter portion 44 in the data packet 40 is 4. In the example of the routing table 61 shown in FIG. 3(B), since this row is the row r5 and the row r5 corresponds to the processing module e14 (the input 2), the switching module ISM2 (30) determines the processing module e14 (the input 2) as an output destination of the data packet 40, and transmits the data packet 40 to the output buffer 33b-2 (the input 2) between itself and the processing module e14. Upon receiving the two inputs (the input 1 in which the value of the processing counter portion 44 is 3 and the input 2 in which the value of the processing counter portion 44 is 4), the processing module e14 executes processing by using both the data packets 40 and transmits the data packet 40 in which the value of the processing counter portion 44 is 5 by adding 1 to the input buffer 33a which forms a pair with the output buffer 33b.

The switching module ISM2 (30) makes reference to the column c4 since an input source of the data packet 40 is the processing module e14, and retrieves a row whose value is 5 in the column c4 because the value of the processing counter portion 44 in the data packet 40 is 5. In the example of the routing table 61 shown in FIG. 3(B), since this row is the row r1 and the row r1 corresponds to the switching module ISM1

(20), the switching module ISM2 (30) determines the switching module ISM1 (20) as an output destination of the data packet 40. The switching module ISM2 (30) adds 1 to the value of the processing counter portion 44 in the data packet 40 to set the value to 6, and then transmits the data packet 40 to the output buffer 34b between itself and the switching module ISM1 (20).

The switching module ISM1 (20) inputs the data packet 40 through the I/F 18 and the input buffer 22a which forms a pair with the output buffer 22b. It makes reference to the column c4 in the routing table 60 since an input source of the data packet 40 is the switching module ISM2 (30), and retrieves a row whose value is 6 in the column c4 because the value of the processing counter portion 44 in the data packet 40 is 6. In the example of the routing table 60 shown in FIG. 3(A), since this row is the row r1 and the row r1 corresponds to the I/O section 10, the switching module ISM1 (20) determines the I/O section 10 as an output destination of the data packet 40, and transmits the data packet 40 to the output buffer 24b between itself and the I/O section 10.

The signal processing of the data packet 40 is executed in this manner. As described above, although the processing module a11 or the like which is used in the signal processing is allocated as an input source and an output destination in the routing table 60 or the like, the processing module, the switching module or the like which is not used for the signal processing is not allocated as both an input source and an output destination in the routing table, and hence such a member is represented as being in the N/A state in processing of the routing table. For example, the processing module c12 is physically connected with the switching module ISM2 (30), but it is not allocated as both an input source and an output destination in the routing table 61, and hence it is shown as being in the N/A state in processing of the routing table 61. That is, the processing module c12 is not connected with the switching module ISM2 (30) in processing of the routing table 61. As described above, the switching module ISM1 (20) or the like can prepare the plurality of routing tables 60 or the like corresponding to signal processing, and can select and use the necessary routing table 60 or the like in accordance with an input data packet. Therefore, with respect to the processing module a11 or the like physically connected with the switching module ISM1 (20) or the like, in accordance with an input data packet, i.e., in accordance with the routing table 60 or the like to be used, a change in connection, e.g., dynamic connection or disconnection can be made at the time of execution. Since the signal processing device 1 can be used as a signal processing section of a software radio device or the like, based on the signal processing device 1 in Embodiment 1 according to the present invention, it is possible to provide a signal processing section of a software radio device or the like which can dynamically change connection itself of a function structure of an internal processing module or the like at the time of execution.

A description will now be given as to a signal processing method and program in Embodiment 1 according to the present invention. Assuming that the switching module ISM1 (20) or the like is a process of controlling an order of signal processing, the processing module a11 or the like is a process of executing various kinds of processing corresponding to each data packet and the data packet is data flowing while being processed between the respective processes, the signal processing device 1 can be regarded as a data flow machine. FIG. 4 is a data flow diagram showing a flow of an operation in a signal processing method and program in Embodiment 1 according to the present invention. In FIG. 4, elements denoted by like reference numerals in FIG. 1 have the same functions and have the same connection relationship as other elements, and hence a detailed explanation will be omitted. As shown in FIG. 4, the I/O section 10 is represented as an input source (a data source) and an output destination (a data absorption); the switching module ISM1 (20), a process connected with the I/O section 10; the processing module a11, a process connected with the switching module ISM1 (20); and the processing module b15, a process connected with the switching module ISM1 (20). Like the above description, it is determined that the I/O section 10 is the outside and the switching module ISM1 (20) is a switching module connected with the outside. The switching module ISM2 (30) is represented as a process connected with the switching module ISM1 (20); the processing module d13, a process connected with the switching module ISM2 (30); and the processing module e14, a process connected with the switching module ISM2 (30).

The pair of input/output buffers 24 is represented as a data store provided between the I/O section 10 and the switching module ISM1 (20); the pair of input/output buffers 21, a data store provided between the switching module ISM1 (20) and the processing module a11; the pair of input/output buffers 22, a data store provided between the switching module ISM1 (20) and the switching module ISM2 (30); and the pair of input/output buffers 23, a data store provided between the switching module ISM1 (20) and the processing module b15. The pair of input/output buffers 34 is represented as a data store provided between the switching module ISM2 (30) and the switching module ISM1 (20); the pair of input/output buffers 32, a data store provided between the switching module ISM2 (30) and the processing module d13; and the pair of input/output buffers 33, a data store provided between the switching module ISM2 (30) and the processing module e14. The routing table 60 and the routing table 61 are expressed as data stores, respectively. A direction of a data flow between respective processes and between each process and each data source and a data absorption is indicated by an arrow. A name given to each arrow is shown in the form of Dj:DP(n). Here, Dj (j≧1) is used to identify each data flow, and DP(n) indicates a data packet (DP) 40 in this data flow whilst n indicates a value of the processing counter portion 44 in the data packet DP 40.

A general flow in the signal processing method and program in Embodiment 1 according to the present invention is as follows. As shown in FIG. 4, the switching module ISM1 (20) inputs the data packet 40 from the outside of the signal processing device 1, the processing module a11 or another switching module ISM2 (30) or the like via the corresponding input buffer 24a, 21a or the like or 22a or the like. Then, it executes routing processing of outputting the data packet 40 to an output destination based on the routing table 60 corresponding to signal processing indicated by the data packet 40 through the corresponding output buffer 24b, 21b or the like or 22b or the like (a routing step). When the output destination at the routing step is the processing module a11 or the like, the processing module a11 or the like receives the data packet 40 transmitted from the switching module ISM1 (20) through the corresponding output buffer 21b or the like. Then, processing indicated by the data packet 40 is executed with respect to the data packet 40. In detail, processing indicated by the data type 46 in the data packet 40 is executed with respect to the signal data 42 in the data packet 40. That is, even in case of using the same processing module a11 or the like, different types of processing can be executed in accordance with the data type 46 in the data packet 40. The data packet 40 is transmitted to the switching module ISM1 (20) side via the input buffer 21a which forms a pair with the corresponding output buffer 21*b* (a processing module step). When the output destination in the routing step is another switching module ISM2 (30) which is different from the switching module ISM1 (20), another switching module ISM2 (30) receives the data packet 40 supplied from the switching module ISM1 (20) through the corresponding output buffer 22*b* or the like. Then, the routing processing is executed with respect to the data packet 40 by using the routing table 61 for another switching module ISM2 (30) corresponding to signal processing indicated by the data packet 40. Subsequently, the data packet 40 is transmitted to the switching module ISM1 (20) side through the input buffer 22*a* which forms a pair with the corresponding output buffer 22*b* (another switching module step).

When the routing tables 60 and 61 depicted in FIGS. 3(A) and (B) are used, a specific flow in the signal processing method and program is as described below. First, the switching module ISM1 (20) inputs the data packet DP(0) 40 from the I/O section 10 as an input source (a data source) through the input buffer 24*a* (a data flow D1). The switching module ISM1 (20) selects the routing table 60 based on the data type 46 in the data packet DP(0) 40. Reference is made to the routing table 60, and the data packet DP(0) 40 is transmitted to the processing module a11 via the output buffer 21*b* since the input source is the I/O section 10 and DP(0) is set (a data flow D2).

The processing module a11 executes processing of the data packet DP(0) 40 (processing corresponding to the data type 46 in the data packet DP(0) 40. This is also applied to the following description), adds 1 to the value of the processing counter portion 44 to set the value to 1, and supplies the data packet DP(1) 40 to the switching module ISM1 (20) through the input buffer 21*a* which forms a pair with the output buffer 21*b* (a data flow D3).

Since the input source of the data packet DP(1) 40 is the processing module a11 and DP(1) is set, the switching module ISM1 (20) transmits the data packet DP(1) 40 to the processing module b15 via the output buffer 23*b* (a data flow D4).

The processing module b15 executes processing of the data packet DP(1) 40, adds 1 to the value of the processing counter portion 44 to set the value to 2, and supplies the data packet DP(2) 40 to the switching module ISM1 (20) through the input buffer 23*a* which forms a pair with the output buffer 23*b* (a data flow D5).

Since the input source of the data packet DP(2) 40 is the processing module b15 and DP(2) is set, the switching module ISM1 (20) adds 1 to the value of the processing counter portion 44 in the data packet DP(2) 40 to set the value to 3, and then transmits the data packet DP(3) 40 to the switching module ISM2 (30) through the output buffer 22*b* (a data flow D6).

The switching module ISM2 (30) inputs the data packet DP(3) 40 through (the I/F 18 and) the input buffer 34*a*, and selects the routing table 61 based on the data type 46 in the data packet DP(3) 40. Making reference to the routing table 61, the switching module ISM2 (30) transmits the data packet DP(3) 40 to the processing module d13 through the output buffer 32*b* since the input source of the data packet DP(3) 40 is the switching module ISM1 (20) (a data flow D7*a*). At the same time, it transmits the data packet DP(3) 40 to the processing module e14 via the output buffer 33*b*-1 (the input 1) (a data flow D7*b*).

The processing module d13 executes processing of the data packet DP(3) 40, adds 1 to the value of the processing counter portion 44 to set the value to 4, and transmits the data packet DP(4) 40 to the switching module ISM2 (30) via the input buffer 32*a* which forms a pair with the output buffer 32*b* (a data flow D8). On the other hand, the processing module e14 keeps processing in a waiting mode until the data packet DP (n>3) 40 arrives at the output buffer 33*b*-2 (the input 2).

Since the input source of the data packet DP(4) 40 is the processing module d13 and DP(4) is set, the switching module ISM2 (30) transmits the data packet DP(4) 40 to the processing module e14 via the output buffer 33*b*-2 (the input 2) (a data flow D9).

The processing module e14 executes processing by using both the data packets DP(3) 40 and DP(4) 40 since the two inputs have arrived, and transmits the data packet DP(5) 40 in which the value of the processing counter portion 44 is 5 by adding 1 thereto to the switching module ISM2 (30) through the input buffer 33*a* which forms a pair with the output buffer 33*b* (a data flow D10).

Since the input source of the data packet 40 is the processing module e14 and DP(5) is set, the switching module ISM2 (30) sets the value of the processing counter portion 44 to 6 by adding 1 thereto, and then transmits the data packet DP(6) 40 to the switching module ISM1 (20) via the output buffer 34*b* which forms a pair with the input buffer 34*a* (a data flow D11).

The switching module ISM1 (20) inputs the data packet DP(6) 40 through (the I/F 18 and) the input buffer 22*a* which forms a pair with the output buffer 22*b*. Since the input source of the data packet DP(6) 40 is the switching module ISM2 (30) and DP(6) is set, the data packet DP(6) 40 is transmitted to the I/O section 10 through the output buffer 24*b* (a data flow D12). In this manner, processing of the data packet DP 40 is executed.

As shown above, according to Embodiment 1 of the present invention, a signal processing device 1 may comprise: a switching module ISM1(20) or the like, which is provided in accordance with signal processing, and uses a routing table 60 or the like indicative of an input source of the data packet 40 and an output destination where the next processing corresponding to a value of the processing counter portion 44 in the data packet 40 is performed to output the data packet 40 input from the input source to the output destination for execution of processing, thereby controlling an order of signal processing; a processing module a11 or the like, which is an input source and an output destination of the routing table 60 or the like, and executes processing indicated by the data packet 40 with respect to the data packet 40 transmitted from the switching module ISM1(20) side to transmit the data packet 40 to the switching module ISM1(20) side or the like; a plurality of sets of input/output buffers 24 or the like which are connected with the switching module ISM1(20) or the like to buffer the data packet 40. The signal processing device 1 is constituted by combining an arbitrary number of switching modules ISM1(20) with an arbitrary number of processing modules a11 or the like through each set of input/output buffers 21 or the like, at least one switching module ISM1(20) or the like is connected with the outside of the signal processing device 1 through corresponding input/output buffers 24. When the plurality of switching modules ISM1(20) or the like are provided, the routing table 60 or the like is indicative of a burden share of signal processing in each switching module ISM1 (20) or the like and is provided in accordance with each switching module ISM1(20) or the like. The switching module ISM1(20) or the like may execute routing processing of inputting a data packet 40 from the outside of the signal processing device 1, the processing module a11 or the like or another switching module ISM2(30) or the like through a corresponding input buffer 24 or the like and outputting the data packet 40 to an output destination based on the routing table 60 or the like corresponding to signal processing indicated by the data packet 40 through a corresponding output buffer 21 or the like. Another switching module ISM2(30) or the like may select and use another routing table 61 or the like for another switching module ISM2(30) corresponding to signal processing indicated by the data packet 40 transmitted from the switching module ISM1(20) or the like through a corresponding output buffer 22b or the like, execute routing processing with respect to the data packet 40, and transmit the data packet 40 to the switching module ISM1(20) side or the like through an input buffer 22a which forms a set with the corresponding output buffer 22b.

The signal processing device 1 can execute signal processing of the data packet 40 in this manner. The switching module ISM1 (20) or the like can prepare the plurality of routing tables 61 or the like corresponding to signal processing, and can select and use the necessary routing table 60 or the like in accordance with an input data packet. Therefore, with respect to the processing module a11 or the like physically connected with the switching module ISM1 (20) or the like, in accordance with an input data packet, i.e., in accordance with the routing table 60 or the like to be used, a change in connection, e.g., dynamic connection or disconnection can be made at the time of execution. Since the signal processing device 1 can be used as a signal processing section of a software radio device or the like, based on the signal processing device 1 in Embodiment 1 according to the present invention, it is possible to provide a signal processing section of a software radio device or the like which can dynamically change connection itself of a function structure of an internal processing module or the like at the time of execution.

In the above description, the number of times of processing executed with respect to the data packet 40 in the processing module a11 or the like was adopted as a state of the data packet 40. In this case, the control of the order of signal processing is as follows. That is, a value of the processing counter portion 44 which is an example of a state portion 44 is added by 1 whenever the data packet 40 passes the processing module. The switching module ISM1(20) or the like can control the order of signal processing by using a routing table 60 or the like indicative of an input source of the data packet 40 and an output destination where the next processing corresponding to a value of the processing counter portion 44 in the data packet 40 is performed, and by outputting the data packet 40 input from the input source to the output destination for execution of processing.

As a state of the data packet 40, as described above, it is possible to use a value which means an output destination where the next processing corresponding to the processing executed in the processing module a11 or the like. In this case, the control of the order of signal processing is as follows. That is, the processing module a11 or the like performs a predetermined operation with respect to a value of the state portion 44 corresponding to the processing in the processing module a11 or the like. The predetermined operation may be the operation of performing arbitrary calculation with respect to the value of the state portion 44, for example, the operation of adding a desired value with respect to the value of the state portion 44. When the desired value is fixed to 1, the control becomes the same one as the case of the above described processing counter portion 44. When the desired value is an arbitrary value including 1, it is possible to perform the control having a plurality of branches. When the desired value is fixed to 1, as shown in FIG. 4, the processing module b15 executes processing of the data packet DP(1)40, adds 1 to the value of the processing counter portion 44 to set the value to 2(branch destination=1). When the desired value has two values such as 1 or 5, according to the processing in the processing module b15 or the result of the processing, two branch destinations can be provided in accordance with the case adding 1 to the value of the processing counter portion 44 to set the value to 2 (first branch destination) and the case adding 5 to the value of it to set the value to 7 (second branch destination). In this case, in addition to the value 2 of the cell in the row r4, the column c3 in the routing table 60 shown in FIG. 3(A), according to the value of the state portion 44=7, it may set the value of the cell in the row 2, column c3 to 7, for example. The switching module ISM1(20) or the like can control the order of signal processing by using the routing table 60 indicative of an input source of the data packet 40 and a plurality of output destination where the next processing corresponding to a value of the processing counter portion 44 in the data packet 40 is performed, and by outputting the data packet 40 input from the input source to the output destinations for execution of processing. The predetermined operation may be the operation which does not change the value of the state portion 44. In this case, the output destination is the same processing module a11 or the like, so that the same processing performs repeatedly again with respect to the data packet 40. A counter for repeat-control (not shown) may be provided separately to set the number of repeating, so that it is possible to implement repeating processing easily for the routing table 60 or the like or the processing module a11 or the like to be able to control the number of repeating. As the state of the data packet 40, it is possible to use a value other than the value which means the output destination where the next processing corresponding to a processing executed in the processing module a11 or the like is performed.

As described above, the routing table 60 or the like having one branch destination shows only outputting the data packet 40 or the like input from an input source to an output destination. That is, since the output destination is limited to one destination in the routing table 60 or the like having one branch destination, to put the number in the routing table 60 or the like itself has meaning, but the value of the number itself has little meaning. So, in the routing table 60 or the like having one branch destination, it is possible to show two ports of an input source and an output destination by putting arbitrary symbol, for example ON or the like in the position showing an output destination and OFF or the like in the other position. In this case, the switching module ISM1(20) or the like can obtain the output destination where the next processing of the data packet 40 is performed, by using only the routing table 60 or the like without referencing the value of the processing counter portion 44 or the processing portion 44. That is, it is possible to flow the data packet 40 or the like between ports instructed a connection by the routing table 60 or the like without depending the number of processing of the data packet 40.

Embodiment 2

A signal processing device 2, method and others in Embodiment 2 according to the present invention will now be described while taking picture demodulation processing in analog TV broadcasting as an example. FIG. 5 shows the signal processing device 2 in Embodiment 2 according to the present invention. In FIG. 5, parts denoted by like reference numerals in FIG. 1 means the same elements, thereby omitting a description thereof. In this Embodiment 2, a description will be given as to a case where specific picture demodulation processing in analog TV broadcasting is executed by using the signal processing device 2 depicted in FIG. 5. A switching module ISM1 (20) (a first switching module) uses a routing table 62 when a data type 46 in an input data packet 40 indicates picture demodulation processing in analog TV broadcasting. The routing table 62 indicates a burden share on the switching module ISM1 (20) side in the picture demodulation processing. The switching module ISM1 (20) is connected with the outside (an I/O section 10) of the signal processing device 2, connected with a low-pass filter processing module 51 which removes a high-frequency component in signal data 42 included in the input data packet 40, and connected with a switching module ISM2 (30). A processing module b15 is in an N/A state in processing of the routing table 62. On the other hand, the switching module ISM2 (30) (a second switching module) uses a routing table 63 indicative of a burden share on the switching module ISM2 (30) side when a data type 46 in an input data packet 40 indicates picture demodulation processing in analog TV broadcasting. The switching module ISM2 (30) is connected with the switching module ISM1 (20), connected with a band-limiting filter processing module 52 which performs band limiting of signal data 42 included in the input data packet 40, connected with a Phase Locked Loop (PLL) and FM demodulator processing module (which will be referred to as a "PLL/FM demodulator processing module" or a "synchronous detection processing module" hereinafter) 53 which generates a signal synchronized with a carrier wave from the signal data 42 included in the input data packet 40, and connected with a mixer processing module 54 which mixes respective signals included in the input two data packets 40. A moving direction of the data packet 40 in each switching module ISM1 (20) or the like is indicated by an arrow of a dotted line in each switching module ISM1 (20) or the like.

FIG. 6(A) shows the routing table 62 which is used by the switching module ISM1 (20) in Embodiment 2. FIG. 6(A) shows the same form routing table as FIG. 3(A), thereby omitting a description of the form itself of the routing table. As shown in FIG. 6(A), as the input sources, there are four columns from a column c1 to a column c4, and the column c1 represents the I/O section 10; the column c2, the low-pass filter processing module 51; the column c3, another switching module ISM2 (30); and the column c4, the processing module b15 (the N/A state). As the output destinations, there are four rows from a row r1 to a row r4, and the row r1 represents the I/O section 10; the row r2, the low-pass filter processing module 51; the row r3, another switching module ISM2 (30); and the row r4, the processing module b15 (the N/A state). As shown in the routing table 62 in FIG. 6(A), the output destination shows another switching module ISM2 (30) when an input source of the data packet 40 is the outside (the I/O section 10) of the signal processing device 1 and a value of the processing counter portion 44 of the data packet 40 is 0, the output destination shows the low-pass filter processing module 51 when an input source is another switching module ISM2 (30) and a value of the processing counter portion 44 is 5, the output destination shows the outside (the I/O section 10) of the signal processing device when an input source is the low-pass filter processing module 51 and a value of the processing counter portion 44 is 6.

On the other hand, FIG. 6(B) shows the routing table 63 which is used by the switching module ISM2(30) in Embodiment 2. FIG. 6(B) also shows the same form routing table as FIG. 3(A), thereby omitting a description of the form itself of the routing table. As shown in FIG. 6(B), as the input sources, there are four columns from a column c1 to a column c4, and the column c1 represents the switching module ISM1 (20); the column c2, the band-limiting filter processing module 52; the column c3, the PLL/FM demodulator processing module 53; and the column c4, the mixer processing module 54. As the output destinations, there are five rows from a row r1 to a row r5, and the row r1 represents the switching module ISM1 (20); the row r2, the band-limiting filter processing module 52; the row r3, the PLL/FM demodulator processing module 53; the row r4, the mixer processing module 54 (the input 1); and the row r5, the mixer processing module 54 (the input 2). As shown in the routing table 63 in FIG. 6(B), the output destination shows the band-limiting filter processing module 52 when an input source of the data packet 40 is the switching module ISM1 (20) and a value of the processing counter portion 44 of the data packet 40 is 1, the output destination shows the PLL/FM demodulator processing module 53 and the mixer processing module 54 (the output buffer 33b-1(a first output buffer)) when an input source is the band-limiting filter processing module 52 and a value of the processing counter portion 44 is 2, the output destination shows the mixer processing module 54 (the output buffer 33b-2 (a second output buffer)) when an input source is the PLL/FM demodulator processing module 53 and a value of the processing counter portion 44 is 3, the output destination shows the switching module ISM1 (20) when an input source is the mixer processing module 54 and a value of the processing counter portion 44 is 4.

A description will now be given as to a signal processing method and program in Embodiment 2 according to the present invention. FIG. 7 is a data flow diagram showing a flow of an operation in a signal processing method and program in Embodiment 2 according to the present invention. In FIG. 7, elements denoted by like reference numerals in FIG. 5 have the same functions and have the same connection relationship as other elements, and hence a detailed explanation will be omitted. The form of the data flow diagram of FIG. 7 is the same as the data flow diagram of FIG. 4, thereby omitting a description of data flow diagram itself.

When the routing tables 62 and 63 depicted in FIGS. 6(A) and (B) are used, a specific flow in the signal processing method and program is as described below. First, the switching module ISM1 (20) inputs the data packet DP(0) 40 from the I/O section 10 as an input source (a data source) through the input buffer 24a (a data flow D20). The switching module ISM1 (20) selects the routing table 62 based on the data type 46 in the data packet DP(0) 40. Reference is made to the routing table 62, since the input source is the I/O section 10 and DP(0) is set, the data packet DP(1) 40 is transmitted to the switching module ISM2 (30) via the output buffer 22b after it adds 1 to the value of the processing counter portion 44 to set the value to 1 (a data flow D21).

The switching module ISM2 (30) inputs the data packet DP(1) 40 through (the I/F 18 and) the input buffer 34a, and selects the routing table 63 based on the data type 46 in the data packet DP(1) 40. Making reference to the routing table 63, the switching module ISM2 (30) transmits the data packet DP(1) 40 to the band-limiting filter processing module 52 through the output buffer 31b since the input source of the data packet DP(1) 40 is the switching module ISM1 (20) and DP(1) is set (a data flow D22).

The band-limiting filter processing module 52 executes band-limiting processing of the signal data 42 included in the data packet DP(1) 40 and returns its result to the signal data 42, adds 1 to the value of the processing counter portion 44 to set the value to 2, and supplies the data packet DP(2) 40 to the switching module ISM2 (30) through the input buffer 31a which forms a pair with the output buffer 31b (a data flow D23).

Next, the switching module ISM2 (30) transmits the data packet DP(2) 40 to the PLL/FM demodulator processing module 53 through the output buffer 32b since the input source of the data packet DP(2) 40 is the band-limiting filter processing module 52 and DP(2) is set (a data flow D24a). At the same time, it transmits the data packet DP(2) 40 to the mixer processing module 54 via the output buffer 33b-1 (the input 1) (a data flow D24b).

The PLL/FM demodulator processing module 53 executes processing which generates a signal synchronized with a carrier wave from the signal data 42 included in the data packet DP(2)40 and returns its result to the signal data 42, adds 1 to the value of the processing counter portion 44 to set the value to 3, and supplies the data packet DP(3) 40 to the switching module ISM2 (30) through the input buffer 32a which forms a pair with the output buffer 32b (a data flow D25). On the other hand, the mixer processing module 54 keeps processing in a waiting mode until the data packet DP (n>2) 40 arrives at the output buffer 33b-2 (the input 2).

Next, the switching module ISM2 (30) transmits the data packet DP(3) 40 to the mixer processing module 54 through the output buffer 33b-2 (the input 2) since the input source of the data packet DP(3) 40 is the PLL/FM demodulator processing module 53 and DP(3) is set (a data flow D26).

The mixer processing module 54 executes mixing processing of each signal data 42 included in both the data packets DP(2) 40 and DP(3) 40 and returns its result to the signal data 42, and transmits the data packet DP(4) 40 in which the value of the processing counter portion 44 is 4 by adding 1 thereto to the switching module ISM2 (30) through the input buffer 33a which forms a pair with the output buffer 33b-1 or the like (a data flow D27).

Since the input source of the data packet DP(4) 40 is the mixer processing module 54 and DP(4) is set, the switching module ISM2 (30) adds 1 to the value of the processing counter portion 44 to set the value to 5, and then transmits the data packet DP(4) 40 to the switching module ISM1 (20) through the output buffer 34b which forms a pair with the input buffer 34a (a data flow D28).

The switching module ISM1 (20) inputs the data packet DP(5) 40 through (the I/F 18 and) the input buffer 22a which forms a pair with the output buffer 22b. Since the input source of the data packet DP(5) 40 is the switching module ISM2 (30) and DP(5) is set, the data packet DP(5) 40 is transmitted to the low-pass filter processing module 51 through the output buffer 21b (a data flow D29).

The low-pass filter processing module 51 removes a high-frequency component in signal data 42 included in the data packet DP(5)40 and returns its result to the signal data 42, adds 1 to the value of the processing counter portion 44 to set the value to 6, and supplies the data packet DP(6) 40 to the switching module ISM1 (20) through the input buffer 21a which forms a pair with the output buffer 21b (a data flow D30).

Since the input source of the data packet DP(6) 40 is the low-pass filter processing module 51 and DP(6) is set, the switching module ISM1 (20) transmits the data packet DP(6) 40 to the I/O section 10 through the output buffer 24b (a data flow D31). In this manner, processing of the data packet DP 40 is executed.

As shown above, according to Embodiment 2 of the present invention, as the signal processing device 2, the following constitution can be used: the low-pass filter processing module 51 and another switching module ISM2 (30) are connected to the switching module ISM1 (20), the band-limiting filter processing module 52 and the PLL/FM demodulator processing module 53 and the mixer processing module 54 are connected to the switching module ISM2 (30). The switching module ISM1 (20) uses the routing table 62 and the switching module ISM2 (30) uses the routing table 63, so that when a data type 46 in an input data packet 40 indicates picture demodulation processing in analog TV broadcasting, the signal processing device 2 can execute picture demodulation processing in analog TV broadcasting with respect to the data packet 40.

Embodiment 3

A signal processing device 3, method and others in Embodiment 3 according to the present invention will now be described while taking AM demodulation processing in AM radio broadcasting as an example. FIG. 8 shows the signal processing device 3 in Embodiment 3 according to the present invention. In FIG. 8, parts denoted by like reference numerals in FIG. 1 means the same elements, thereby omitting a description thereof. In this Embodiment 3, a description will be given as to a case where specific AM demodulation processing in AM radio broadcasting is executed by using the signal processing device 3 depicted in FIG. 8. A switching module ISM1 (20) (a first switching module) uses a routing table 64 when a data type 46 in an input data packet 40 indicates AM demodulation processing in AM radio broadcasting. The routing table 64 indicates a burden share on the switching module ISM1 (20) side in the AM demodulation processing. The switching module ISM1 (20) is connected with the outside (an I/O section 10) of the signal processing device 3, connected with a low-pass filter processing module 51 which removes a high-frequency component in signal data 42 included in the input data packet 40, and connected with a switching module ISM2 (30). A processing module b15 is in an N/A state in processing of the routing table 64. On the other hand, the switching module ISM2 (30) (a second switching module) uses a routing table 65 indicative of a burden share on the switching module ISM2 (30) side when a data type 46 in an input data packet 40 indicates AM demodulation processing in AM radio broadcasting. The switching module ISM2 (30) is connected with the switching module ISM1 (20), connected with a PLL/FM demodulator processing module (synchronous detection processing module) 53 which generates a signal synchronized with a carrier wave from the signal data 42 included in the input data packet 40, and connected with a mixer processing module 54 which mixes respective signals included in the input two data packets 40. A processing module c12 is in an N/A state in processing of the routing table 65. A moving direction of the data packet 40 in each switching module ISM1 (20) or the like is indicated by an arrow of a dotted line in each switching module ISM1 (20) or the like.

FIG. 9(A) shows the routing table 64 which is used by the switching module ISM1 (20) in Embodiment 3. FIG. 9(A) shows the same form routing table as FIG. 6(A), thereby omitting a description of the form itself of the routing table. As shown in FIG. 9(A), as the input sources, there are four columns from a column c1 to a column c4, and the column c1 represents the I/O section 10; the column c2, the low-pass filter processing module 51; the column c3, another switching module ISM2 (30); and the column c4, the processing module b15 (the N/A state). As the output destinations, there are four rows from a row r1 to a row r4, and the row r1 represents the I/O section 10; the row r2, the low-pass filter processing module 51; the row r3, another switching module ISM2 (30); and the row r4, the processing module b15 (the N/A state). As shown in the routing table 64 in FIG. 9(A), the output destination shows another switching module ISM2 (30) when an input source of the data packet 40 is the outside (the I/O section 10) of the signal processing device 1 and a value of the processing counter portion 44 of the data packet 40 is 0, the output destination shows the low-pass filter processing module 51 when an input source is another switching module ISM2 (30) and a value of the processing counter portion 44 is 4, the output destination shows the outside (the I/O section 10) of the signal processing device when an input source is the low-pass filter processing module 51 and a value of the processing counter portion 44 is 5.

On the other hand, FIG. 9(B) shows the routing table 65 which is used by the switching module ISM2(30) in Embodiment 3. FIG. 9(B) also shows the same form routing table as FIG. 63(A), thereby omitting a description of the form itself of the routing table. As shown in FIG. 9(B), as the input sources, there are four columns from a column c1 to a column c4, and the column c1 represents the switching module ISM1 (20); the column c2, the processing module c12 (the N/A state); the column c3, the PLL/FM demodulator processing module 53; and the column c4, the mixer processing module 54. As the output destinations, there are four rows from a row r1 to a row r5, and the row r1 represents the switching module ISM1 (20); the row r2, the processing module c12 (the N/A state); the row r3, the PLL/FM demodulator processing module 53; the row r4, the mixer processing module 54 (the input 1); and the row r5, the mixer processing module 54 (the input 2). As shown in the routing table 65 in FIG. 9(B), the output destination shows the PLL/FM demodulator processing module 53 and the mixer processing module (the output buffer 33b-1 (a first output buffer)) 54 when an input source of the data packet 40 is the switching module ISM1 (20) and a value of the processing counter portion 44 of the data packet 40 is 1, the output destination shows the mixer processing module 54 (the output buffer 33b-2 (a second output buffer)) when an input source is the PLL/FM demodulator processing module 53 and a value of the processing counter portion 44 is 2, the output destination shows the switching module ISM1 (20) when an input source is the mixer processing module 54 and a value of the processing counter portion 44 is 3.

A description will now be given as to a signal processing method and program in Embodiment 3 according to the present invention. FIG. 10 is a data flow diagram showing a flow of an operation in a signal processing method and program in Embodiment 3 according to the present invention. In FIG. 10, elements denoted by like reference numerals in FIG. 8 have the same functions and have the same connection relationship as other elements, and hence a detailed explanation will be omitted. The form of the data flow diagram of FIG. 10 is the same as the data flow diagram of FIG. 4 or the like, thereby omitting a description of data flow diagram itself.

When the routing tables 64 and 65 depicted in FIGS. 9(A) and (B) are used, a specific flow in the signal processing method and program is as described below. First, the switching module ISM1 (20) inputs the data packet DP(0) 40 from the I/O section 10 as an input source (a data source) through the input buffer 24a (a data flow D40). The switching module ISM1 (20) selects the routing table 64 based on the data type 46 in the data packet DP(0) 40. Reference is made to the routing table 64, since the input source is the I/O section 10 and DP(0) is set, the data packet DP(1) 40 is transmitted to the switching module ISM2 (30) via the output buffer 22b after it adds 1 to the value of the processing counter portion 44 in the data packet DP(0)40 to set the value to 1 (a data flow D41).

The switching module ISM2 (30) inputs the data packet DP(1) 40 through (the I/F 18 and) the input buffer 34a, and selects the routing table 65 based on the data type 46 in the data packet DP(1) 40. Making reference to the routing table 65, the switching module ISM2 (30) transmits the data packet DP(1) 40 to the PLL/FM demodulator processing module 53 through the output buffer 32b since the input source of the data packet DP(1) 40 is the switching module ISM1 (20) and DP(1) is set (a data flow D42a). At the same time, it transmits the data packet DP(1) 40 to the mixer processing module 54 via the output buffer 33b-1 (the input 1) (a data flow D42b).

The PLL/FM demodulator processing module 53 executes processing which generates a signal synchronized with a carrier wave from the signal data 42 included in the data packet DP(1)40 and returns its result to the signal data 42, adds 1 to the value of the processing counter portion 44 to set the value to 2, and supplies the data packet DP(2) 40 to the switching module ISM2 (30) through the input buffer 32a which forms a pair with the output buffer 32b (a data flow D43). On the other hand, the mixer processing module 54 keeps processing in a waiting mode until the data packet DP (n>1) 40 arrives at the output buffer 33b-2 (the input 2).

Next, the switching module ISM2 (30) transmits the data packet DP(2) 40 to the mixer processing module 54 through the output buffer 32b-2 (the input 2) since the input source of the data packet DP(2) 40 is the PLL/FM demodulator processing module 53 and DP(2) is set (a data flow D44).

The mixer processing module 54 executes mixing processing of each signal data 42 included in both the data packets DP(1) 40 and DP(2) 40 and returns its result to the signal data 42, and transmits the data packet DP(3) 40 in which the value of the processing counter portion 44 is 3 by adding 1 thereto to the switching module ISM2 (30) through the input buffer 33a which forms a pair with the output buffer 33b-1 or the like (a data flow D45).

Since the input source of the data packet DP(3) 40 is the mixer processing module 54 and DP(3) is set, the switching module ISM2 (30) adds 1 to the value of the processing counter portion 44 to set the value to 4, and then transmits the data packet DP(4) 40 to the switching module ISM1 (20) through the output buffer 34b which forms a pair with the input buffer 34a (a data flow D46).

The switching module ISM1 (20) inputs the data packet DP(4) 40 through (the I/F 18 and) the input buffer 22a which forms a pair with the output buffer 22b. Since the input source of the data packet DP(4) 40 is the switching module ISM2 (30) and DP(4) is set, the data packet DP(4) 40 is transmitted to the low-pass filter processing module 51 through the output buffer 21b (a data flow D47).

The low-pass filter processing module 51 removes a high-frequency component in signal data 42 included in the data packet DP(4)40 and returns its result to the signal data 42, adds 1 to the value of the processing counter portion 44 to set the value to 5, and supplies the data packet DP(5) 40 to the switching module ISM1 (20) through the input buffer 21a which forms a pair with the output buffer 21b (a data flow D48).

Since the input source of the data packet DP(5) 40 is the low-pass filter processing module 51 and DP(5) is set, the switching module ISM1 (20) transmits the data packet DP(5) 40 to the I/O section 10 through the output buffer 24b (a data flow D49). In this manner, processing of the data packet DP 40 is executed.

As shown above, according to Embodiment 3 of the present invention, as the signal processing device 3, the following constitution can be used: the low-pass filter processing module 51 and another switching module ISM2 (30) are connected to the switching module ISM1 (20), the PLL/FM demodulator processing module 53 and the mixer processing module 54 are connected to the switching module ISM2 (30). The switching module ISM1 (20) uses the routing table 64 and the switching module ISM2 (30) uses the routing table 65, so that when a data type 46 in an input data packet 40 indicates AM demodulation processing in AM radio broadcasting, the signal processing device 3 can execute AM demodulation processing in AM radio broadcasting with respect to the data packet 40.

Embodiment 4

As described above, each processing module a11 or the like executes processing corresponding to a data type 46 in a data packet 40. In this Embodiment 4, a method of the processing and particulars concerning the processing will be described. FIG. 11 is a view illustrating a processing method or the like of each processing module which is common to signal processing devices 1 to 3 in Embodiment 4 according to the present invention. In FIG. 11, since parts denoted by like reference numerals in FIG. 1 means the same elements, a description thereof will be omitted, and a path pd1 or the like for the data packet 40 is omitted for the convenience's sake.

The processing module a11 or the like has a parameter table indicative of processing which should be executed with respect to signal data 42 in a data packet 40 in accordance with a data type 46 in the data packet 40 for each processing module a11 or the like. The processing module a11 or the like executes processing corresponding to the input data packet 40 with respect to the signal data 42 by using each parameter table, and thereby outputs the data packet 40 having the signal data 42. As shown in FIG. 11, the processing module a11 has a parameter table 71, and other processing modules b15, c12, d13 and e14 have respective parameter tables 75, 72, 73 and 74.

Contents of each parameter table 71 or the like are not fixed, and they can be arbitrarily initialized and dynamically rewritten later. The signal processing device 1 or the like can receive from the outside (an I/O section 10) a parameter packet PP including an identifier (which will be described later) of the processing module a11 or the like and contents of the parameter table 71 or the like of the processing module a11 or the like through a path for a data packet DP 40. The signal processing device 1 or the like can dynamically rewrite contents of the parameter table 71 or the like by transmitting the input parameter packet PP to the processing module a11 or the like specified by the identifier based on predetermined conditions through the path for the data packet DP 40.

As described above, the parameter packet PP can be input via the path for the data packet DP 40 and transmitted to the processing module a11 or the like based on predetermined conditions. However, a path dedicated to a parameter packet PP different from the path for the data packet DP 40 may be provided so that the parameter packet PP is input or transmitted to the processing module a11 or like by using this path dedicated to the parameter packet PP based on predetermined conditions. FIG. 11 shows a path (a path for rewriting. It is indicated by an outline arrow) different from the data packet path through which the data packet 40 is transmitted, e.g., a path pp0 which connects the I/O section 10 with the switching module ISM1 (20), a path pp1 which connects the switching module ISM1 (20) with the processing module a11, or the like. This path pp0 or the like is a path which sequentially connects the outside (the I/O section 10) portion of the signal processing device 1 or the like and one or more switching modules like the switching module ISM1 (20) and another switching module ISM2 (30), and is also a path which connects the switching module ISM1 (20) or the like with the processing module a11 or the like. Although other paths (indicated by outline arrows) are not denoted by reference numerals for the convenience's sake, every path is a path for rewriting.

An identifier of each processing module will now be described. As shown in FIG. 11, an identifier (000-01 or the like) which identifies each module is indicated for each of the switching module ISM1 (20) or the like, the processing module a11 or the like and others. This identifier is constituted of an identifier (e.g., three bits) of the switching module ISM1 (20) or the like in the signal processing device 1 or the like and an identifier (e.g., two bits) of the processing module a11 or the like in the switching module ISM1 (20) or the like, and recorded in accordance with each of the processing module a11 or the like and the switching module ISM1 (20) or the like. For example, "000-01" is indicated as an identifier of the processing module a11, and "000" consisting of three bits in a front part represents an identifier of the switching module ISM1 (20) to which the processing module a11 is connected in the signal processing device 1 or the like whilst "01" consisting of two bits in a rear part represents an identifier (an internal identifier) of the processing module a11 in the processing module or the like (or in the switching module ISM1 (20)) connected with the switching module ISM1 (20). The identifier of the switching module ISM1 (20) is indicated as "000-00", and "000" consisting of three bits in a front part represents an identifier of the switching module ISM1 (20) in the signal processing device 1 or the like whilst "00" consisting of two bits in a rear part represents that the corresponding module is the switching module itself. In another example, an identifier of the processing module d13 is indicated as "001-10", and "001" consisting of three bits in a front part represents an identifier of the switching module ISM2 (30) having the processing module d13 connected thereto in the signal processing device 1 or the like whilst "10" consisting of two bits in a rear part represents an identifier of the processing module d13 in the processing module or the like (or in the switching module ISM2 (30) connected with the switching module ISM2 (30). An identifier of the switching module ISM2 (30) is indicated as "001-00", and "000" consisting of three bits in a front part represents an identifier of the switching module ISM2 (30) in the signal processing device 1 or the like as described above whilst "00" consisting of two bits in a rear part represents that the corresponding module is the switching module itself. Identifiers of other modules are the same as those of the respective modules, thereby omitting a description thereof. In the above description, the identifier is divided into two parts, and three bits in the front part constitute an identifier of the switching module ISM1 (20) or the like in the signal processing device 1 or the like whilst two bits in the rear part constitute an identifier of the processing module a11 or the like in the switching module ISM1 (20), but it is just an example, a series of bits may be used to identify the switching module ISM1 (20) or the like and the processing module a11 or the like and the number of bits for identification may be an arbitrary number of bits.

As described above, the input parameter packet PP includes an identifier (000-01 or the like) of the processing module a11 or the like, and a front part of this identifier represents an identifier (e.g., 000) of the switching module ISM1 (20) or the like having the processing module a11 or the like connected thereto whilst a rear part of the same represents an internal identifier (e.g., 01). Thus, the predetermined conditions can be set as follows. That is, when an identifier of the switching module ISM1(20) or the like which has input the parameter packet PP through the rewriting path pp0 matches with an identifier (e.g., 000) of the switching module included in (in an identifier of the processing module a11 or the like) the parameter packet PP, it is possible to adopt a setting by which the parameter packet PP is transmitted to the processing module a11 or the like having the same identifier as an internal identifier (e.g., 01) included in the parameter packet PP. As a result, contents of the parameter table 71 or the like can be dynamically rewritten. Since the rewriting path pp0 can be provided separately from the path for the data packet DP 40, dynamic rewriting of contents of the parameter table 71 or the like can be concurrently executed with signal processing of the data packet 40. Therefore, contents of the parameter table 71 or the like can be occasionally tuned during signal processing of the data packet 40.

On the other hand, when an identifier of the switching module ISM1 (20) or the like which has input the parameter packet PP through the rewriting path pp0 does not match with an identifier (e.g., 001) of the switching module included in the parameter packet PP, it is good enough to transmit the parameter packet PP to the switching module ISM2 (30) or the like sequentially connected with the switching module ISM1 (20) or the like through the rewriting path pp2 or the like. Next, when an identifier of the switching module ISM2 (30) or the like which has input the parameter packet PP matches with an identifier (e.g., 001) of the switching module ISM2 (30) or the like included in the parameter packet PP, it is good enough to transmit the parameter packet PP to the processing module c12 or the like having the same identifier as an internal identifier (e.g., 01) included in the parameter packet PP. As a result, contents of the parameter table 72 or the like can be dynamically rewritten. When there is no sequentially connected switching module, processing can be terminated by erasing the parameter packet PP. Alternatively, the parameter packet PP can be set to be returned to the outside of the signal processing device 1 or the like.

Although the above has described that the parameter packet PP includes contents of the parameter table 71 or the like, it may include contents of the routing table 60 or the like of the switching module ISM1 (20). Contents of each routing table 60 or the like can be dynamically rewritten by transmitting such a parameter packet PP to one or more switching modules ISM1 (20) or the like through the path of the data packet DP 40, the rewriting path pp0 or the like.

As shown above, according to Embodiment 4 of the present invention, the signal processing device 1 or the like can comprise the identifier and the parameter table 71 or the like for each of the processing module a11 or the like and the switching module ISM1(20) or the like, and the rewriting path pp0 or the like connecting the outside (the I/O section 10) and each module. The parameter table 71 or the like indicates the processing which should be executed by the processing module 11a or the like with respect to signal data 42 in a data packet 40 in accordance with a data type 46 in the input data packet 40. The signal processing device 1 or the like can input the parameter packet PP including the identifier (e.g., 000-01) of the processing module a11 or the like and the content of the parameter table 71 or the like of the processing module a11 or the like via the rewriting path pp0 from the outside (the I/O section 10). The signal processing device 1 or the like can rewrite dynamically the content of the parameter table 71 or the like by transmitting the input parameter packet PP to the processing module a11 or the like specified by the identifier based via the rewriting path PP1 or the like on the predetermined condition. Further, the parameter packet PP can include the content of the routing table 60 or the like of the switching module ISM1 (20) or the like. Contents of each routing table 60 or the like can be dynamically rewritten by transmitting such a parameter packet PP to one or more switching modules ISM1 (20) or the like through the path of the rewriting path pp0 or the like.

Embodiment 5

FIG. 12 is a block diagram showing an internal circuit 80 of computers of the switching module ISM1 (20) or the like in the signal processing device 1 or the like which execute computer programs (signal processing programs) of the present invention described above. As shown in FIG. 12, CPU 81, ROM 82, RAM 83, an image control section 86, a controller 87, an input control section 89, an external interface section (I/F) (for a data packet) 91 and an external I/F section (for a parameter packet) 92 are connector to a bus 93. In FIG. 12, the computer programs of the present invention described above can be recorded on a recording medium (including a removable recording medium) such as ROM 82, disk 88a or CD-ROM 88n or the like. The routing table 60 or the like and parameter table 71 or the like used by the signal processing method or program or the like of the present invention described above can be recorded on a recording medium (including a removable recording medium) such as ROM 82, disk 88a or CD-ROM 88n or the like. The computer programs of the present invention are loaded into the RAM 83 by way of the bus 93, or by way of the bus 93 and over the controller 87 from a recording medium such as disk 88a or CD-ROM 88n or the like. An input control section 89 is connected to an input operation section 90 such as mouse, keyboard or the like and performs input control or the like. VRAM 85 which is used as image memory and has a capacity sufficient for data capacity of at least a single screen of a display section of signal processing device 1 or the like, an image control section 86 has a function for converting data of VRAM 85 to image data and transmitting it to the display section. The external I/F section (for a data packet) 91 has an input/output interface function when communicating with the I/O section 10, the switching module ISM2(30) or the like and the processing module, such as the processing module a11, the low-pass filter processing module 51 or the like through the path pd1 or the like for a data packet 40. The external I/F section (for a parameter packet) 82 has an input/output interface function when communicating with the I/O section 10, the switching module ISM2(30) or the like and the processing module, such as the processing module a11, the low-pass filter processing module 51 or the like through the path pp1 or the like for a parameter packet 40.

As described above, the object of the present invention can be achieved by means of the CPU 81 executing the computer program of the present invention described above. The computer program can be supplied to the computer CPU 81 in the form of a recording medium such as CD-ROM 88n or the like, the recording medium such as CD-ROM 88n or the like having the computer program recorded thereon also constitutes the present invention. As a recording medium having the computer program recorded thereon other than the above described recording medium, for example, a memory card, a memory stick, DVD, an optical disk, FD or the like can be used.

In Embodiment 1 and others mentioned above, the description has been given as to the case where a computer such as a switching module ISM1 (20) in the signal processing device 1 or the like executes the signal processing program according to the present invention. However, a processing module such as a processing module a11, a low-pass filter processing module 51 or the like may include a computer having such an internal circuit 80 as shown in FIG. 12 to execute processing in each processing module.

Embodiment 6

In each of the foregoing embodiments, the description has been given as to the example where the processing module is the low-pass filter processing module 51, the PLL/FM demodulator processing module 53, the mixer processing module 54 or the like. However, as the processing module, any other arbitrary module can be designed and connected. For example, it is possible to realize orthogonal frequency division multiplexing (OFDM) modulation/demodulation processing by connecting a plurality of modules or the like which perform processing of, e.g., a scrambling module, a convolution code/Viterbi decoding module and others.

Further, it is possible to enhance functions in units of switching modules, e.g., enhance functions of the signal processing device 1 or the like by cascade-connecting switching modules. For example, it is possible to realize functions such as OFDN modulation/demodulation processing, ASK modulation/demodulation processing, QPSK modulation/demodulation processing and others by enhancing functions in units of switching modules, and thereby executing modulation/demodulation processing of AM radio and FM radio. Adding a plurality of processing modules can cope with not only AM radio, FM radio and analog TV but also other various kinds of processing. An use efficiency per unit module can be increased by utilizing a processing module in common. Since data packets 40 can be processed by respective processing modules in parallel (pipeline processing) when each processing module executes input and output of a data packet 40 in each desired cycle time, processing performance of the signal processing device 1 or the like can be increased. When a plurality of data packets 40 having different data types 46 are input to the signal processing device 1 or the like, time-sharing parallel processing can be executed with respect to a plurality of medias such as AM radio, FM radio, analog TV and others.

INDUSTRIAL APPLICABILITY

As utilization examples of the signal processing device 1 or the like according to the present invention, this device can be applied to not only picture demodulation processing of analog TV broadcasting and AM demodulation processing of AM radio broadcasting mentioned above but also audio demodulation processing of analog TV broadcasting, AM and FM demodulation processing of FM radio broadcasting and others.

BRIEF DESCRIPTION OF THE DRAWINGS

FIG. 3(A) shows the routing table 60 which is used by the switching module ISM1 (20) in Embodiment 1.

FIG. 3(B) shows the routing table 61 which is used by the switching module ISM2 (30) in Embodiment 1 according to the present invention.

FIG. 6(A) shows the routing table 62 which is used by the switching module ISM1 (20) in Embodiment 2.

FIG. 6(B) shows the routing table 63 which is used by the switching module ISM2(30) in Embodiment 2.

FIG. 9(A) shows the routing table 64 which is used by the switching module ISM1 (20) in Embodiment 3.

FIG. 9(B) shows the routing table 65 which is used by the switching module ISM2(30) in Embodiment 3.

Figure 1:
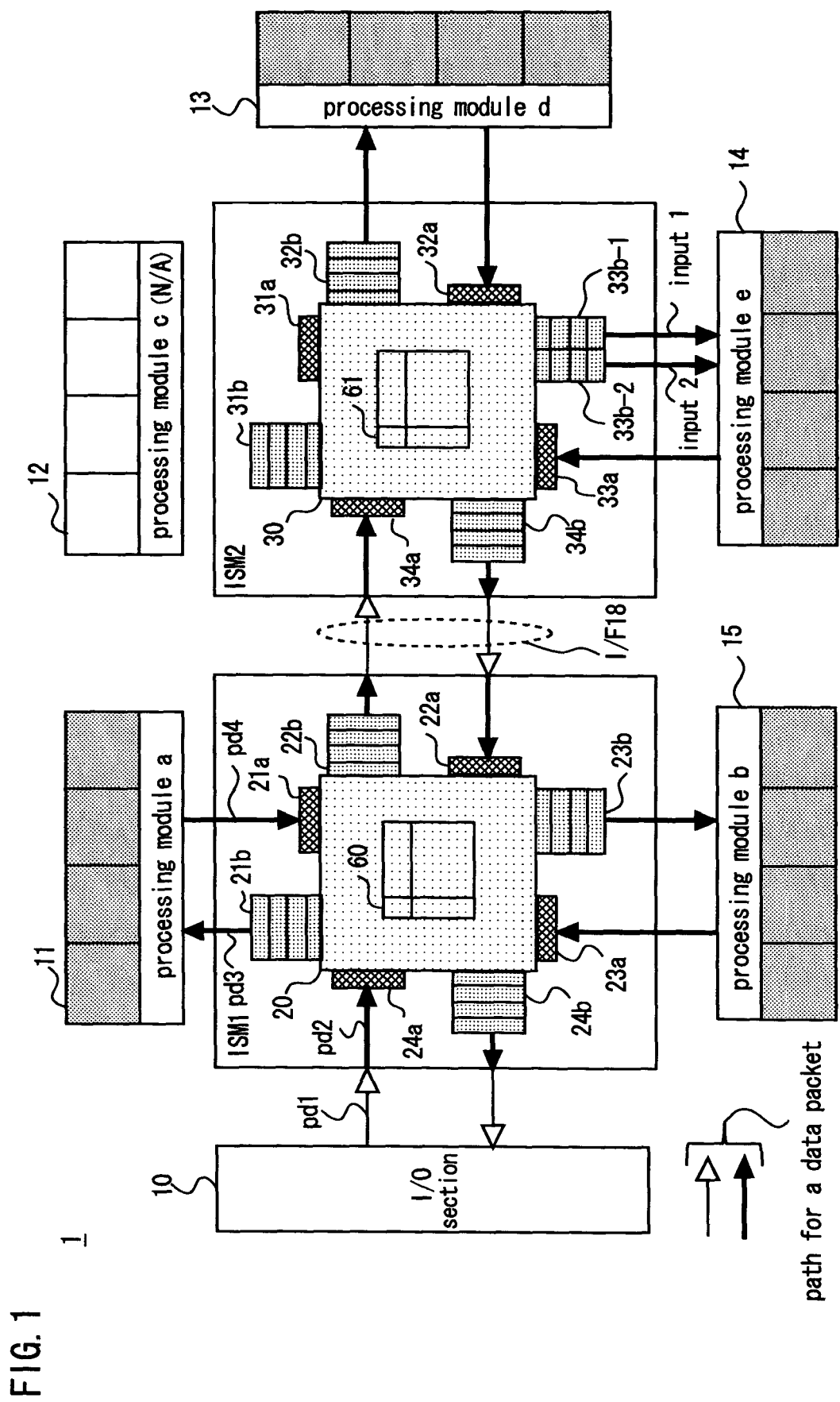
FIG. 1 shows a signal processing device 1 in Embodiment 1 according to the present invention.
Figure 2:
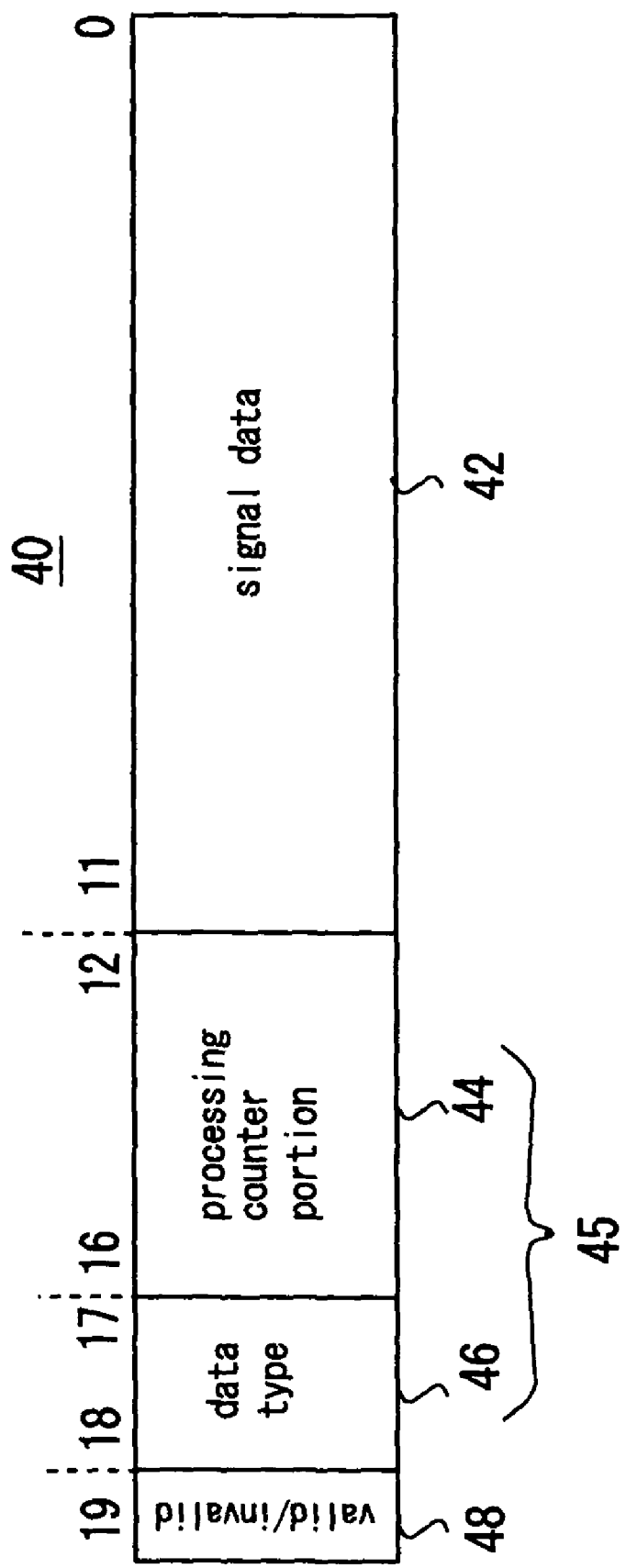
FIG. 2 shows a structural example of a data packet.
Figure 4:
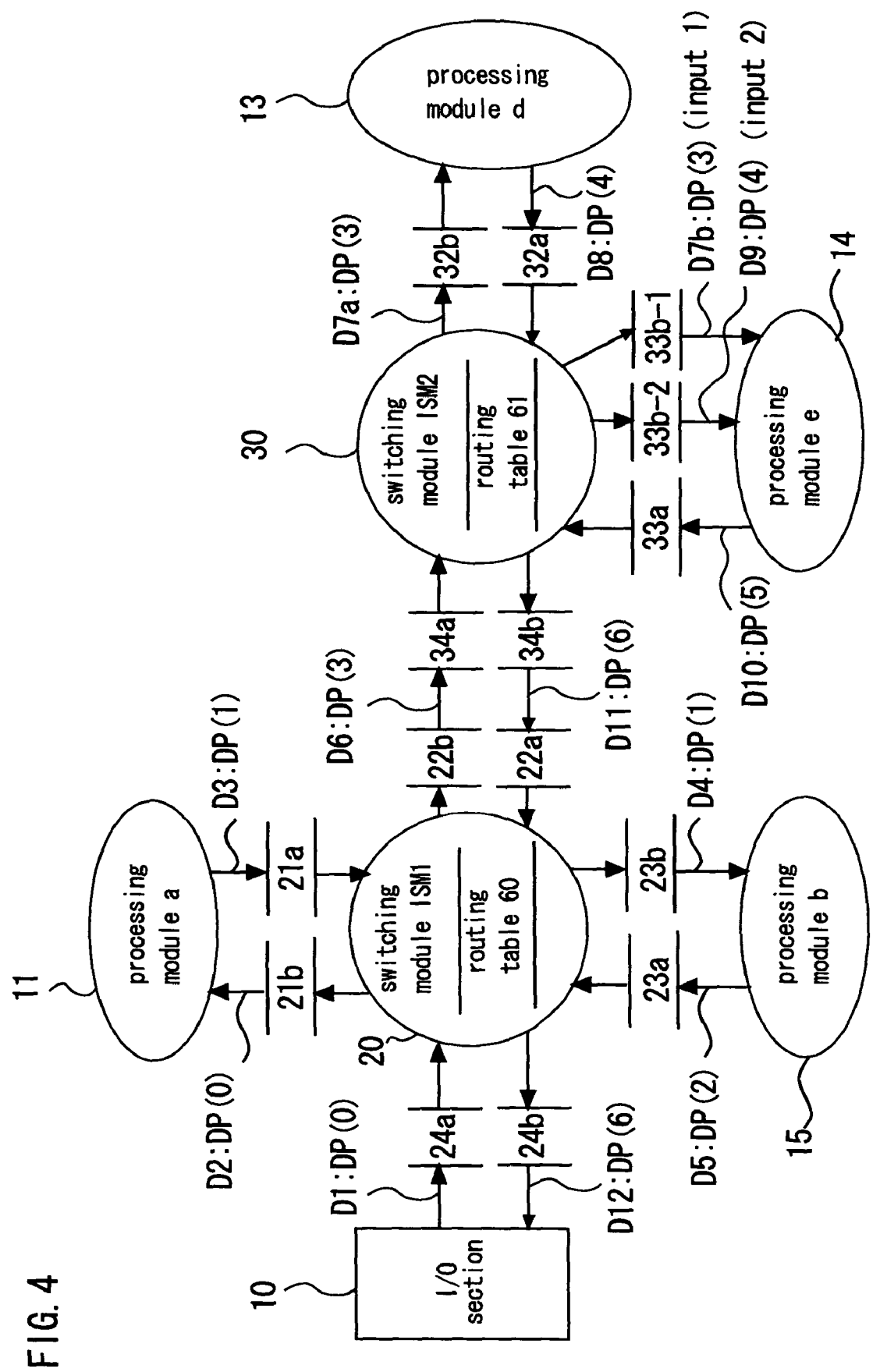
FIG. 4 is a data flow diagram showing a flow of an operation in a signal processing method and program in Embodiment 1 according to the present invention.
Figure 5:
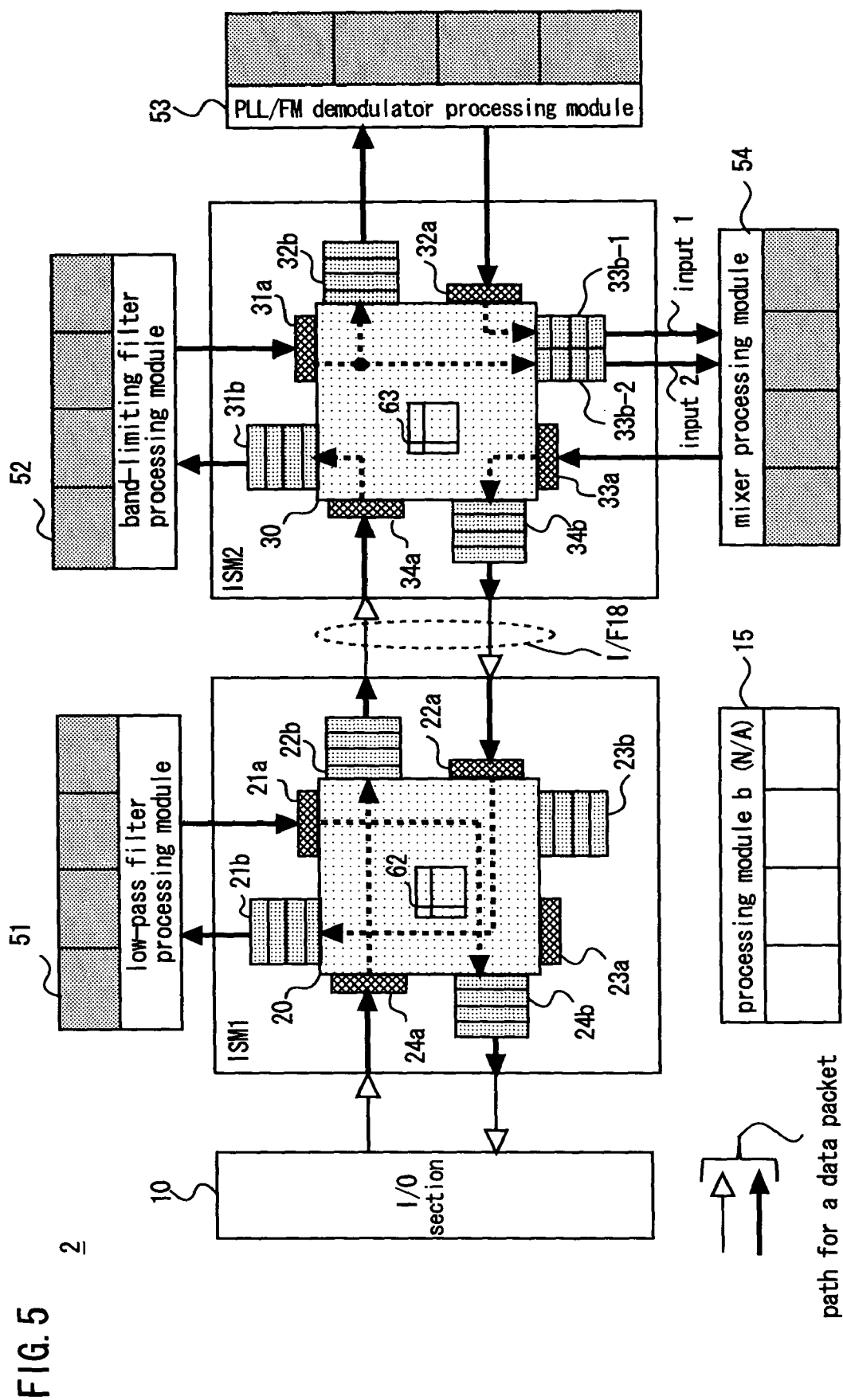
FIG. 5 shows the signal processing device 2 in Embodiment 2 according to the present invention.
Figure 7:
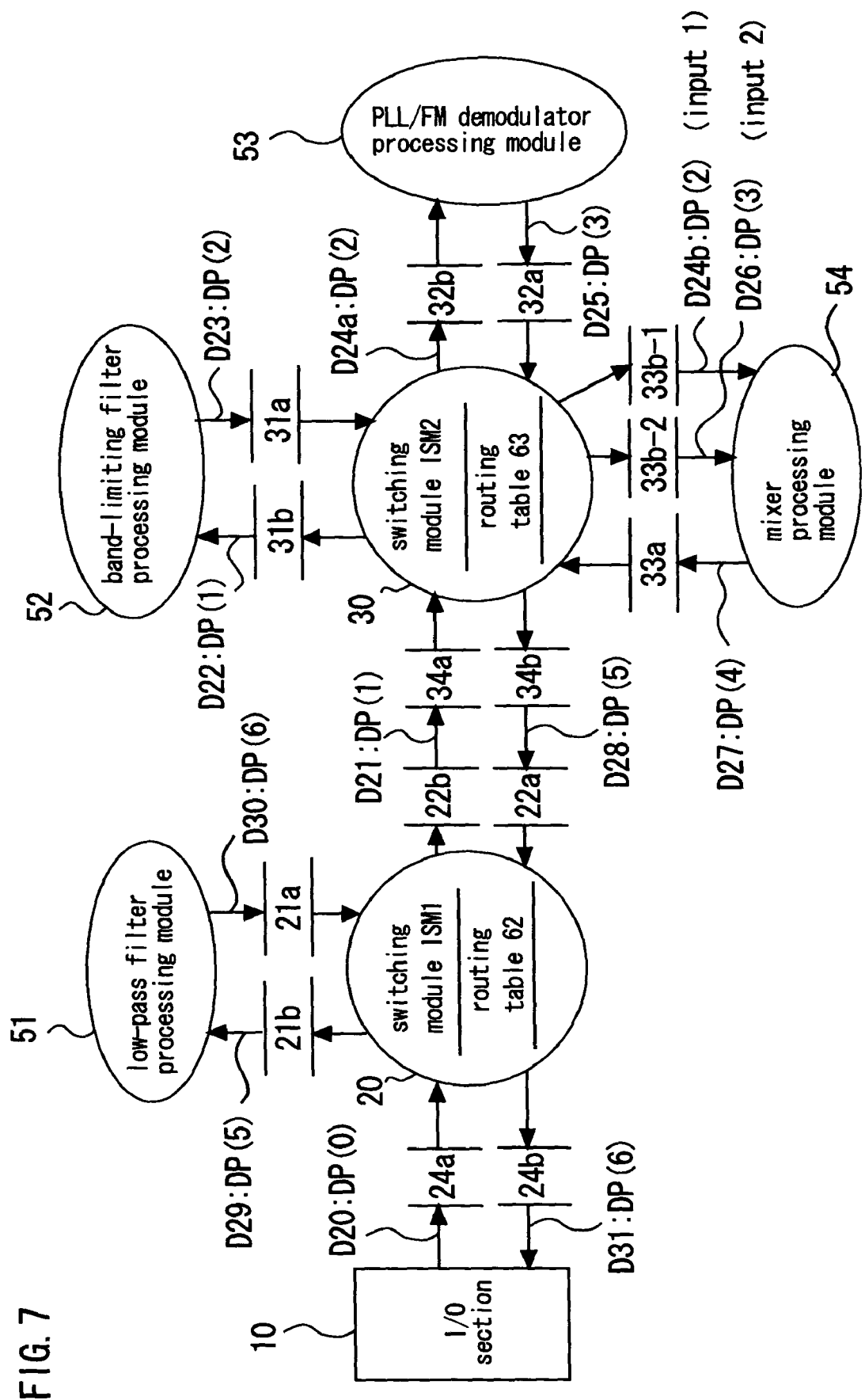
FIG. 7 is a data flow diagram showing a flow of an operation in a signal processing method and program in Embodiment 2 according to the present invention.
Figure 8:
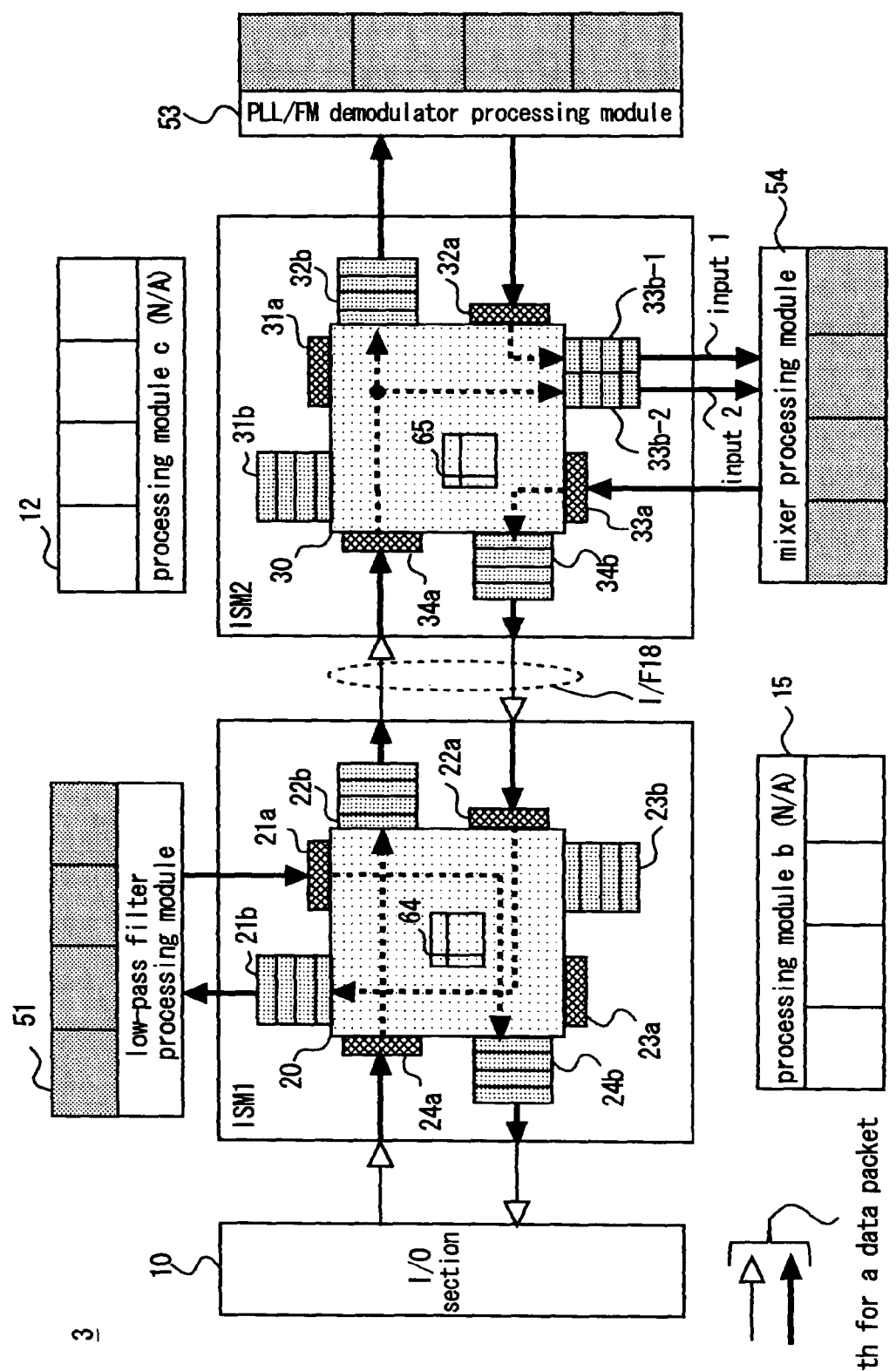
FIG. 8 shows the signal processing device 3 in Embodiment 3 according to the present invention.
Figure 10:
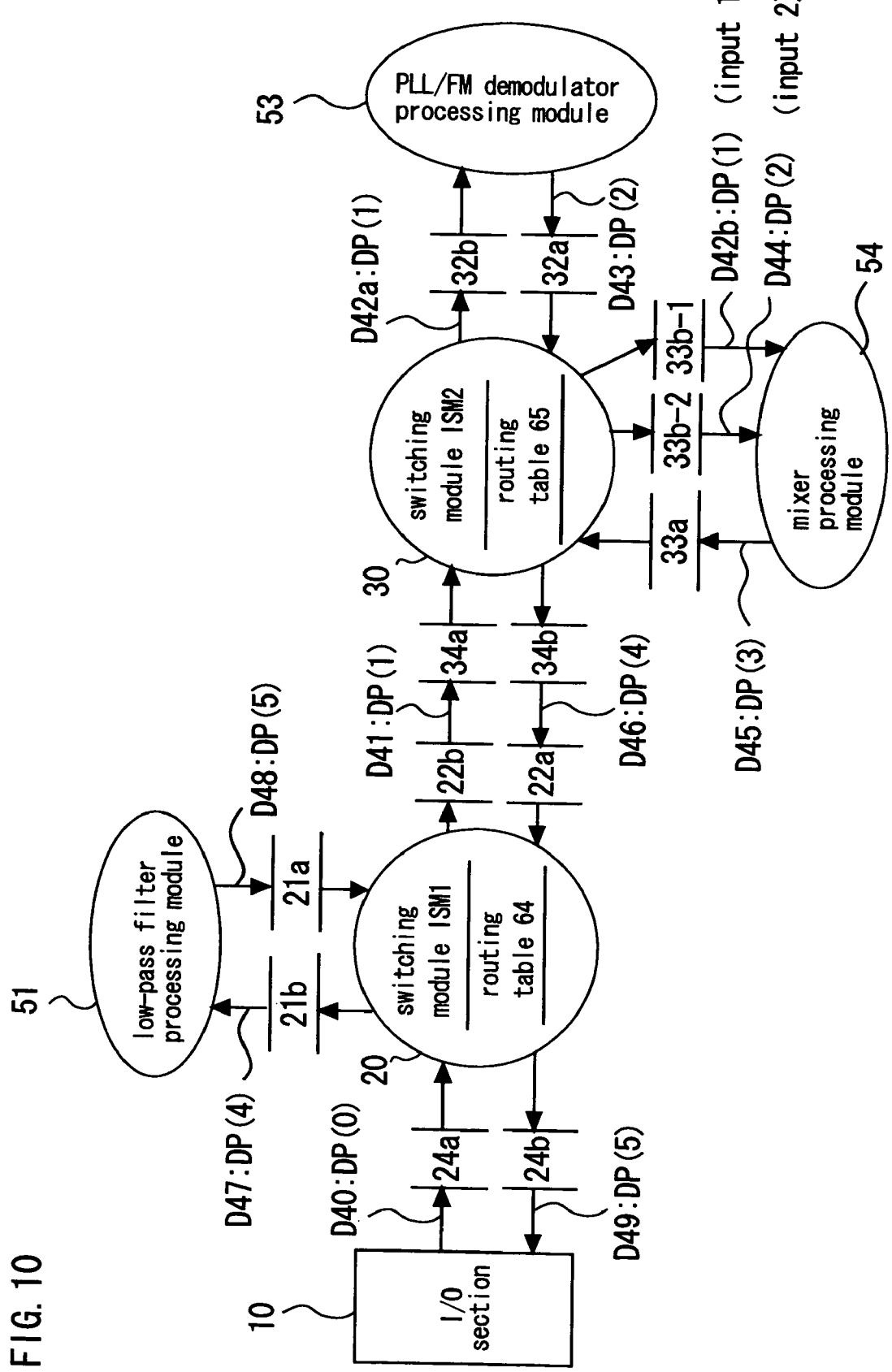
FIG. 10 is a data flow diagram showing a flow of an operation in a signal processing method and program in Embodiment 3 according to the present invention.
Figure 11:
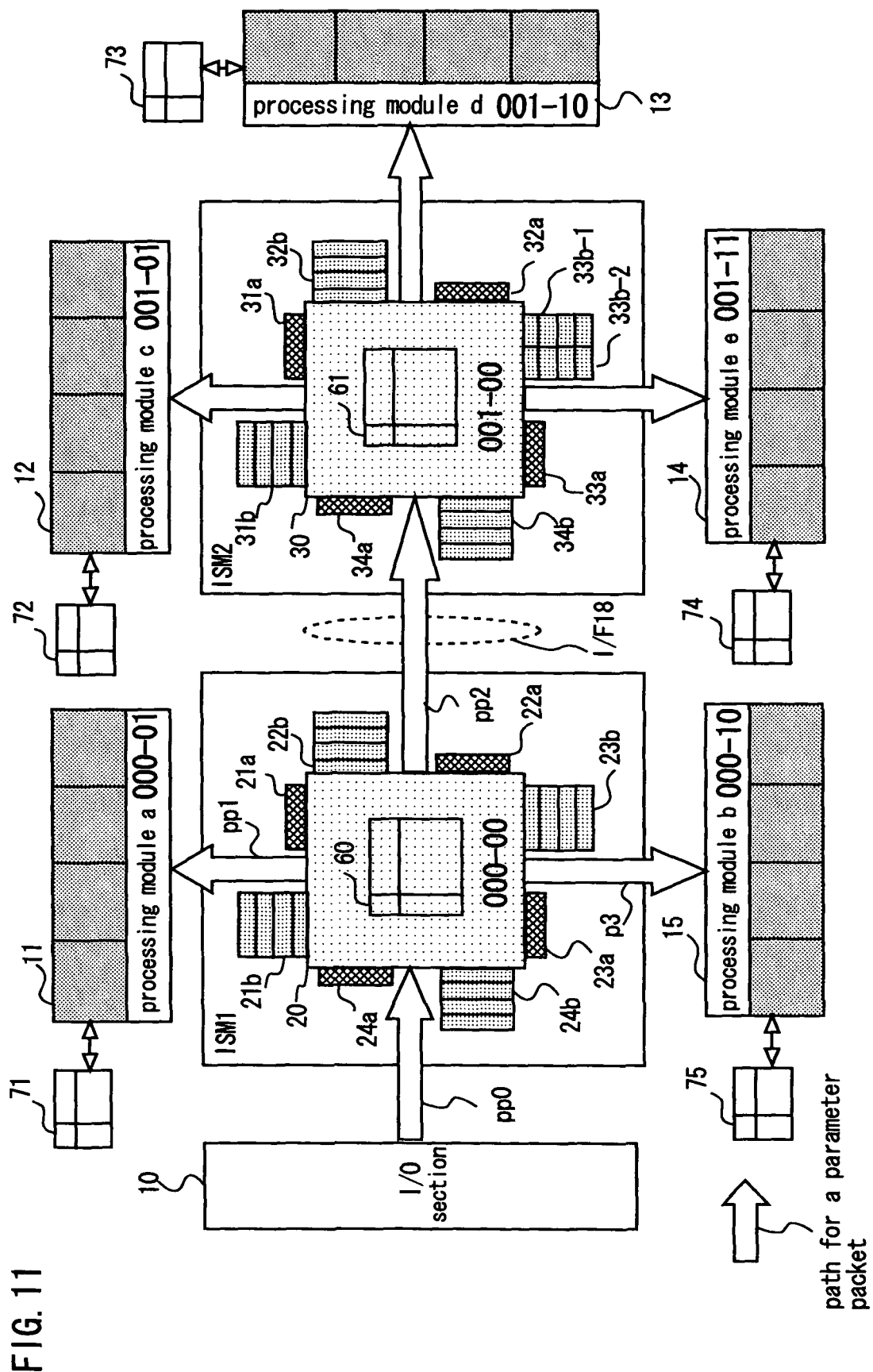
FIG. 11 is a view illustrating a processing method or the like of each processing module which is common to signal processing devices 1 to 3 in Embodiment 4 according to the present invention.
Figure 12:
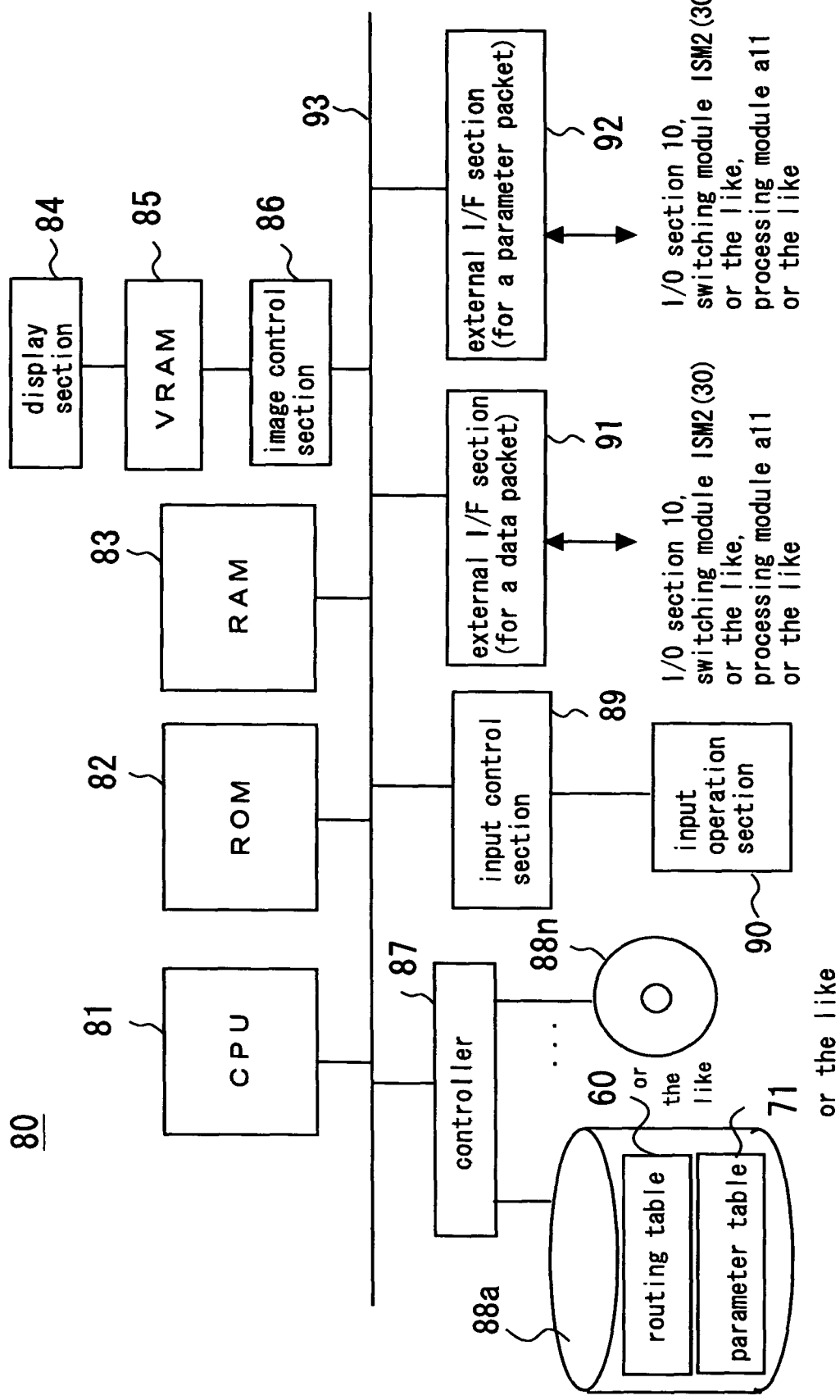
FIG. 12 is a block diagram showing an internal circuit 80 of computers of the switching module ISM1 (20) or the like in the signal processing device 1 or the like which execute computer programs (signal processing programs) of the present invention described above.

EXPLANATIONS OF LETTERS OR NUMERALS 1, 2, 3 a signal processing device, 10 an I/O section, 11a processing module a, 12 a processing module c, 13 a processing module d, 14 a processing module e, 15 a processing module b, 18 an interface (I/F), 20, 30 a switching module ISM1, 21, 22, 23, 24, 31, 32, 33, 34 a pair of input/output buffer, 21a, 22a, 23a, 24a, 31a, 32a, 33a, 34a an input buffer, 21b, 22b, 23b, 24b, 31b, 32b, 33b-1, 33b-2, 34b an output buffer, 40 a data packet, 42 a signal data, 44 a processing counter section, 46 a data type, 45 a tag (or a header), 48 a valid/invalid bit, 51a low-pass filter processing module, 52 a band-limiting filter processing module, 53 a PLL/FM demodulation processing module (a synchronous detection processing module), 54 a mixer processing module, 60, 61, 62, 63, 64, 65 a routing table, 71, 72, 73, 74, 75 a parameter table, 80 an internal circuit, 81 CPU, 82 ROM, 83 RAM, 84 a display section, 85 VRAM, 86 an image control section, 87 a controller, 88a disk, 88n CD-ROM, 89 an input control section, 90 an input operation section, 91 an external I/F section (for a data packet), 92 an external I/F section (for a parameter packet), 93 a bus.

What is claimed is:

1. A signal processing device adapted to perform signal processing according to an input data packet, the device comprising:

one or more switching modules each adapted for signal processing, each switching module having a routing table listing an input source of a data packet and an output destination where next processing is to be performed, and adapted to output the data packet input from the input source to the output destination for execution of processing, thereby controlling an order of signal processing;

at least one processing module adapted to be an input source and an output destination listed in the routing table, and adapted to execute signal processing indicated by a data packet transmitted from one of the switching modules to said at least one processing module; and a plurality of sets of input/output buffers each set being connected to a corresponding switching module and adapted to buffer data packets, each input buffer adapted to buffer data packets which are input to the corresponding switching module from an input source listed in the routing table, and each output buffer adapted to buffer data packets to be output to an output destination listed in the routing table of the corresponding switching module, wherein said signal processing device is constituted by combining said switching modules with said at least one processing module through the corresponding set of said input/output buffers, at least one of said switching modules being connected to the outside of said signal processing device through the corresponding input/output buffer, each routing table indicating a signal processing load in the switching module corresponding to that routing table, wherein each switching module is adapted to execute routing processing of data packets input from the outside of said signal processing device, from said processing module or from a different switching module through a corresponding input buffer and outputting the data packet to an output destination based on the routing table corresponding to signal processing indicated by the data packet through a corresponding output buffer, wherein each processing module is adapted to execute processing indicated by a data packet transmitted from one of the switching modules through a corresponding output buffer with respect to the data packet, and to transmit the data packet to the one switching module through the input buffer associated with the corresponding output buffer, and wherein said different switching module is adapted to execute routing processing with respect to a data packet transmitted from a switching module through a corresponding output buffer by using a routing table for said different switching module corresponding to signal processing indicated by the data packet, and to transmit the data packet to said switching module through an input buffer which forms a set with the corresponding output buffer.

2. The signal processing device according to claim 1, wherein each data packet includes a data type indicating a type of signal processing to be performed and signal data to be processed by the signal processing, and wherein said processing module is adapted to executes processing corresponding to a data type of the signal data in an input data packet.

3. The signal processing device according to claim 2, wherein each data packet further includes a state portion indicating a state concerning a destination for the next processing of the data packet, said processing module adapted to execute processing corresponding to a data type with respect to signal data in an input data packet and to perform a predetermined operation corresponding to the processing with respect to a value of the state portion, and each routing table is provided in accordance with a data type of a data packet, and indicates at least one output destination where the data packet is to be processed next based on data packet input source and state portion value.

4. The signal processing device according to claim 3, wherein each switching module performs a predetermined operation based on a state portion value when outputting a data packet to a different switching module.

5. The signal processing device according to claim 1, wherein a plurality of output buffers in each set of said input/output buffers are provided in accordance with each said processing module to be connected.

6. The signal processing device according to claim 5, comprising first and second switching modules, the first switching module being connected with the outside of said signal processing device and connected with a low-pass filter processing module which removes a high-frequency component of signal data, wherein a first state value in a data packet state portion indicates a number of times to execute processing of the data packet in the processing module, said processing module adapted to executes processing corresponding to a data type of signal data in an input data packet and to add 1 to a value of the state portion and to output the data packet, said switching module adapted to add 1 to a value of the state portion when outputting a data packet to a different switching module, and when a data type of an input data packet indicates picture demodulation processing in analog television broadcasting to include as first switching module routing table entries:

a first entry which indicates said second switching module as an output destination when an input source of a data packet is the outside of said signal processing device and a value of the state portion in the data packet is 0;

a second entry which indicates said low-pass filter processing module as an output destination when an input source of a data packet is said second switching module and a value of the state portion in the data packet is 5; and a third entry which indicates the outside of said signal processing device as an output destination when an input source of a data packet is said low-pass filter processing module and a value of the state portion in the data packet is 6, wherein said second switching module is connected with said first switching module and also connected with:

a band-limiting filter processing module which performs band limiting processing on signal data included in an input data packet;

a synchronous detection processing module which generates a signal synchronized with a carrier wave from signal data included in an input data packet;

and a mixer processing module which mixes respective signals included in two input data packets, and when a data type of an input data packet indicates picture demodulation processing in analog television broadcasting, includes as second switching module routing table entries:

a first entry which indicates said band-limiting filter processing module as an output destination when an input source of a data packet is said first switching module and a value of the state portion in the data packet is 1;

a second entry which indicates said synchronous detection processing module and a first output buffer of two output buffers for said mixer processing module as output destinations when an input source of a data packet is said band-limiting filter processing module and a value of the state portion of the data packet is 2;

a third entry which indicates a second output buffer of two output buffers for said mixer processing module as an output destination when an input source of a data packet is said synchronous detection module and a value of the detection portion of the data packet is 3; and a fourth entry which indicates said first switching module as an output destination when an input source of a data packet is said mixer processing module and a value of the state portion in the data packet is 4.

7. The signal processing device according to claim 6, wherein, when a data type of an input data packet inputted from outside of said signal processing device indicates picture demodulation processing in an analog television broadcast, based on the first switching module routing table or the second switching module routing table, said first switching module sets a value of a state portion in the input data packet to 1 by adding 1 thereto and outputs the input data packet to said second switching module, said second switching module outputs the input data packet to said band-limiting filter processing module, said band-limiting filter processing module executes processing of the input data packet and sets the value of the state portion to 2 by adding 1 thereto to output the data packet to said second switching module, said second switching module outputs the input data packet to said synchronous detection processing module and the first output buffer of said mixer processing module, said synchronous detection processing module executes processing of the input data packet and sets the value of the state portion to 3 by adding 1 thereto to output the input data packet to said second switching module, said second switching module outputs the input data packet to the second output buffer of said mixer processing module, said mixer processing module executes processing of the input data packet input through the first output buffer and the second output buffer and sets the value of the state portion to 4 by adding 1 thereto to output the input data packet to said second switching module, said second switching module sets the value of the state portion in the input data packet to 5 by adding 1 thereto and outputs the input data packet to said first switching module, and said first switching module outputs the input data packet to said low-pass filter processing module, said low-pass filter processing module executes processing of the input data packet and sets the value of the state portion to 6 by adding 1 thereto to output the input data packet to said first switching module, and said first switching module outputs the input data packet to outside of said signal processing device.

8. The signal processing device according to claim 5, comprising first and second switching modules, said first switching module being connected to an outside of said signal processing device and connected to a low-pass filter processing module adapted to remove a high-frequency component of signal data included in an input data packet, wherein a state in a state portion indicates a number of times of processing to be executed with respect to an input data packet in said processing module, wherein said processing module is adapted to:

execute processing corresponding to a data type with respect to signal data of the input data packet, and add 1 to a value of the state portion and outputs the data packet, wherein each switching module is adapted to add 1 to the value of the state portion when outputting a data packet to another switching module, and when a data type of an input data packet indicates audio demodulation processing in an amplitude modulation radio broadcasting, the first switching module includes a first switching module routing table having:

a first entry which indicates said second switching module as an output destination when an input source of the input data packet is the outside of said signal processing device and a value of a state portion of the data packet is 0;

a second entry which indicates said low-pass filter processing module as an output destination when an input source of the input data packet is said second switching module and a value of a state portion of the data packet is 4; and a third entry which indicates the outside of said signal processing device as an output destination when an input source of the input data packet is said low-pass filter processing module and a value of a state portion of the data packet is 5, wherein said second switching module is connected with said first switching module and connected with:

a synchronous detection processing module which generates a signal synchronized with a carrier wave from signal data included in the input data packet; and a mixer processing module which mixes respective signals included in two input data packets, and when a data type of an input data packet indicates audio demodulation processing in amplitude modulation radio broadcasting, the second switching module includes a second switching module routing table having:

a first entry which indicates said synchronous detection processing module and a first output buffer of two output buffers for said mixer processing module as output destinations when an input source of the input data packet is said first switching module and a value of a state portion of the data packet is 1;

a second entry which indicates a second output buffer of the two output buffers for said mixer processing module as an output destination when an input source of the input data packet is said synchronous detection processing module and a value of a state portion of the data packet is 2; and a third entry which indicates said first switching module as an output destination when an input source of the input data packet is said mixer processing module and a value of a state portion of the data packet is 3.

9. The signal processing device according to claim 8, wherein when an input data type of a data packet inputted from the outside of said signal processing device indicates audio demodulation processing in an amplitude modulation radio broadcasting, based on the first switching module routing table or the second switching module routing table, said first switching module adapted to set a value of a state portion of the input data packet to 1 by adding 1 thereto and outputs the input data packet to said second switching module, said second switching module adapted to outputs the input data packet to said synchronous detection processing module and the first output buffer of said mixer processing module, wherein said synchronous detection processing module executes processing of the input data packet and sets a value of the state portion to 2 by adding 1 thereto to output the input data packet to said second switching module, wherein said second switching module outputs the input data packet to the second output buffer of said mixer processing module, said mixer processing module executes processing of the input data packet input through the first output buffer and the second output buffer and sets the value of the state portion to 3 by adding 1 thereto to output the input data packet to said second switching module, and wherein said second switching module sets the value of the state portion of the input data packet to 4 by adding 1 thereto and outputs the input data packet to said first switching module, wherein said first switching module outputs the input data packet to said low-pass filter processing module, said low-pass filter processing module executes processing of the input data packet and sets the value of the state portion to 5 by adding 1 thereto to output the input data packet to said first switching module, and said first switching module outputs the input data packet to the outside of said signal processing device.

10. The signal processing device according to claim 1, wherein said processing module processes and outputs an input data packet by using a parameter table for each processing module which indicates processing corresponding to the input data packet.

11. The signal processing device according to claim 10, wherein a parameter packet which is input from the outside of said signal processing device includes a processing module identifier and parameter table contents and is transmitted to a processing module specified by the processing module identifier based on predetermined conditions, thereby dynamically rewriting the contents of the parameter table of the specified processing module.

12. The signal processing device according to claim 11, wherein the processing module identifier includes a switching module identifier identifying the switching module connected to the specified processing module and an internal identifier which identifies the specified processing module connected with the switching module and, under predetermined conditions, the parameter packet is transmitted to a processing module having a same identifier as the internal identifier included in the parameter packet when an identifier of a switching module which has input the parameter packet matches the switching module identifier included in the parameter packet.

13. The signal processing device according to claim 12, wherein the parameter packet is transmitted to switching modules sequentially connected with the identified switching module when the identifier of said switching module which has input the parameter packet does not match the switching module identifier included in the parameter packet, and the parameter packet is erased when there are no sequentially connected switching modules.

14. The signal processing device according to claim 11, wherein a packet including switching module routing table contents is transmitted to the one or more switching modules, thereby dynamically rewriting the contents of the routing table in those switching modules.

15. A signal processing method to control a signal processing device adapted to execute signal processing indicated by an input data packet, the method comprising:

routing, at a first switching module of the signal processing device, a data packet input from the outside of the signal processing device, a processing module of the signal processing device or a different switching module through a corresponding input buffer and outputting the data packet to an output destination through a corresponding output buffer, the outputting based on a routing table corresponding to a signal processing type indicated by the data packet, the switching module having a routing table indicative of an input source of the data packet and an output destination where the next processing is to be executed, to output the data packet to thereby controlling an order of signal processing;

executing, at a processing module of the signal processing device, when an output destination of said routing is the processing module, processing indicated by a data packet transmitted from the first switching module through a corresponding output buffer with respect to the data packet and transmitting the data packet to the first switching module through an input buffer which forms a set with the corresponding output buffer, the processing module adapted to be an input source and an output destination listed in the routing table and to execute signal processing indicated by the data packet with respect to the data packet transmitted from the switching module side to transmit the data packet to the switching module side; and outputting the data packet to a second switching module different from the first switching module, the second switching module having second routing table corresponding to signal processing indicated by the data packet transmitted from the first switching module through a corresponding output buffer to execute routing processing with respect to the data packet and transmitting the data packet to the first switching module side through an input buffer which forms a set with the corresponding output buffer.

16. The signal processing method according to claim 15, wherein the data packet includes a data type indicative of a type of signal processing and signal data which is to be processed, and when the switching module is connected with the processing module, the switching module inputs a data packet in which the signal data of the data packet is processed according to the data type by the processing module.

17. The signal processing method according to claim 16, wherein the data packet further includes a state portion having a state used to determine a destination for the next processing of the data packet, the switching module inputs a data packet in which the signal data of the data packet corresponds to the type of signal processing performed by the processing module, and the value of the state portion is a predetermined operation corresponding to the processing performed by the processing module, and the routing table is provided in accordance with a data type of a data packet in accordance with each switching module, and indicative of at least one output destination where the data packet is to be processed next based on an input source of a data packet and a value of the state portion.

18. The signal processing method according to claim 17, wherein when the output destination in said routing step is another switching module, the method further comprises performing a predetermined operation with respect to a value of the state portion of the input data packet.

19. The signal processing method according to claim 15, wherein a plurality of output buffers in one set of said input/output buffers are provided in accordance with each additional processing module to be connected to the processing module.

20. The signal processing method according to claim 19, the signal processing device comprising first and second the switching modules, the first switching module being connected with an outside of the signal processing device and connected with a low-pass filter processing module adapted to remove a high-frequency component of signal data included in an input data packet, wherein a state in the state portion indicates a number of times of processing to be executed in the processing module with respect to a data packet, the processing module executes processing corresponding to a data type with respect to signal data in an input data packet and adds 1 to a value of the state portion to output the data packet, the switching module adds 1 to a value of the state portion when outputting a data packet to the another switching module, and when a data type of an input data packet is indicative of picture demodulation processing in analog television broadcasting the first switching module includes a first switching module routing table having:
- a first entry which indicates the second switching module as an output destination when an input source of a data packet is the outside of the signal processing device and a value of the state portion in the data packet is 0;
- a second entry which indicates the low-pass filter processing module as an output destination when an input source of a data packet is the second switching module and a value of the state portion in the data packet is 5; and
- a third entry which indicates the outside of the signal processing device as an output destination when an input source of a data packet is the low-pass filter processing module and a value of the state portion in the data packet is 6, the second switching module being connected with the first switching module and also connected with:
- a band-limiting filter processing module which performs band limiting of signal data included in an input data packet;
- a synchronous detection processing module which generates a signal synchronized with a carrier wave from signal data included in an input data packet; and
- a mixer processing module which mixes respective signals included in two input data packets, and, when a data type of an input data packet indicates picture demodulation processing in analog television broadcasting the second switching module includes a second switching module routing table having:
  - a first entry which indicates the band-limiting filter processing module as an output destination when an input source of a data packet is the first switching module and a value of the state portion in the data packet is 1;
  - a second entry which indicates the synchronous detection processing module and a first output buffer of two output buffers for the mixer processing module as output destinations when an input source of a data packet is the band-limiting filter processing module and a value of the state portion of the data packet is 2;
  - a third entry which indicates a second output buffer of two output buffers for the mixer processing module as an output destination when an input source of a data packet is the synchronous detection module and a value of the detection portion of the data packet is 3; and
  - a fourth entry which indicates the first switching module as an output destination when an input source of a data packet is the mixer processing module and a value of the state portion in the data packet is 4.

21. The signal processing method according to claim 20, wherein, when a data type of a data packet input from the outside of said signal processing device indicates picture demodulation processing in analog television broadcast, based on the first or the second switching module routing table, the method further comprises:
- setting, at the first switching module, a value of the state portion in the data packet to 1 by adding 1 thereto and outputting the data packet to the second switching module;
- outputting, at the second switching module, the input data packet to the band-limiting filter processing module;
- processing, at the band-limiting filter processing module, the input data packet and setting the value of the state portion to 2 by adding 1 thereto to output the data packet to the second switching module;
- outputting, at the second switching module, the input data packet to the synchronous detection processing module and the first output buffer of the mixer processing module;
- processing, at which the synchronous detection processing module, the input data packet and setting the value of the state portion to 3 by adding 1 thereto to output the data packet to the second switching module;
- outputting, at the second switching module, the input data packet to the second output buffer of the mixer processing module;
- processing, at the mixer processing module, the data packet input through the first output buffer and the second output buffer and setting the value of the state portion to 4 by adding 1 thereto to output the data packet to the first switching module;
- setting, at the second switching module, the value of the state portion in the input data packet to 5 by adding 1 thereto and outputting the data packet to the second switching module;
- outputting, at the first switching module, the input data packet to the low-pass filter processing module;
- processing, at the low-pass filter processing module the input data packet and setting the value of the state portion to 6 by adding 1 thereto to output the data packet to the first switching module; and
- outputting, at the first switching module, the input data packet to the outside of the signal processing device.

22. The signal processing method according to claim 19, wherein the signal processing device comprises first and second switching modules, the first switching module being connected to the outside of the signal processing device and connected to a low-pass filter processing module which removes a high-frequency component of signal data included in an input data packet,
wherein a state in the state portion indicates a number of times of processing to be executed with respect to a data packet in the processing module, the processing module executing processing corresponding to a data type with respect to signal data of an input data packet, adds 1 to a value of the state portion and outputs the data packet, and the switching module adds 1 to the value of the state portion when outputting the data packet to another switching module, and when a data type of an input data packet indicates audio demodulation processing in amplitude modulation radio broadcasting the first switching module includes a first switching module routing table having:
- a first entry which indicates the second switching module as an output destination when an input source of a data packet is the outside of the signal processing device and a value of a state portion of the data packet is 0;
- a second entry which indicates the low-pass filter processing module as an output destination when an input source of a data packet is the second switching module and a value of a state portion of the data packet is 4; and
- a third entry which indicates the outside of the signal processing device as an output destination when an input source of a data packet is the low-pass filter processing module and a value of a state portion of the data packet is 5, the second switching module being connected with the first switching module and connected with:
- a synchronous detection processing module which generates a signal synchronized with a carrier wave from signal data included in an input data packet; and a mixer processing module which mixes respective signals included in input two data packets, and when a data type of an input data packet indicates audio demodulation processing in amplitude modulation radio broadcasting the second switching module includes a second switching module routing table having:
a first entry which indicates the synchronous detection processing module and a first output buffer of two output buffers for the mixer processing module as output destinations when an input source of a data packet is the first switching module and a value of a state portion of the data packet is 1;
a second entry which indicates a second output buffer of the two output buffers for the mixer processing module as an output destination when an input source of a data packet is the synchronous detection processing module and a value of a state portion of the data packet is 2; and
a third entry which indicates the first switching module as an output destination when an input source of a data packet is the mixer processing module and a value of a state portion of the data packet is 3.

23. The signal processing method according to claim 22, wherein when a data type of a data packet input from the outside of the signal processing device indicates audio demodulation processing in amplitude modulation radio broadcasting, based on the first switching module routing table or the second switching module routing table the method further comprises,
setting, at the first switching module a value of a state portion of the data packet to 1 by adding 1 thereto and outputting the data packet to the second switching module;
outputting, at the second switching module, the input data packet to the synchronous detection processing module and the first output buffer of the mixer processing module;
processing, at the synchronous detection processing module, the input data packet and setting a value of the state portion to 2 by adding 1 thereto to output the data packet to the second switching module;
outputting, at the second switching module, the input data packet to the second output buffer of the mixer processing module;
processing, at the mixer processing module, the data packet input through the first output buffer and the second output buffer and setting the value of the state portion to 3 by adding 1 thereto to output the data packet to the second switching module;
setting, at which the second switching module, the value of the state portion of the input data packet to 4 by adding 1 thereto and outputting the data packet to the first switching module;
outputting, at the first switching module, the input data packet to the low-pass filter processing module;
processing, at the low-pass filter processing module, the input data packet and setting the value of the state portion to 5 by adding 1 thereto to output the data packet to the first switching module; and
outputting at the first switching module, the input data packet to the outside of the signal processing device.

24. The signal processing method according to claim 15, wherein when the switching module is connected to the processing module, the processing of data packet in the processing module is performed using a parameter table for each processing module which indicates processing corresponding to the input data packet.

25. The signal processing method according to claim 24, wherein the signal processing device inputs a parameter packet which includes a processing module identifier and parameter table contents from the outside of the signal processing device and transmits the parameter table contents to a processing module specified by the processing module identifier based on predetermined conditions, and dynamically rewrites the contents of the parameter table.

26. The signal processing method according to claim 25, wherein the processing identifier module includes an identifier of the switching module to which the processing module is connected and an internal identifier which identifies the processing module connected with the switching module and, under predetermined conditions, the parameter packet is transmitted to a processing module having the same identifier as the internal identifier included in the parameter packet when an identifier of a switching module which has input the parameter packet matches with the identifier of the switching module included in the parameter packet.

27. The signal processing method according to claim 26, wherein the parameter packet is transmitted to switching modules sequentially connected with the switching module when the identifier of the switching module which has input the parameter packet does not match with the identifier of the switching module included in the parameter packet, and the parameter packet is erased when there are no sequentially connected switching modules do not exist.

28. The signal processing method according to claim 25, wherein a packet including contents of the routing table of the switching module is transmitted to one or more additional switching modules connected to the switching module, thereby dynamically rewriting the contents of the routing table of those switching modules.

29. A non-transitory computer-readable medium having encoded thereon a set of instructions that, when executed by a computer of a switching module of a signal processing device, cause the computer to perform signal processing operations indicated by an input data packet, the operations comprising:
routing, at first switching module of the signal processing device, a data packet input from outside of the signal processing device, from a processing module or from another switching module through a corresponding input buffer and outputting the data packet to an output destination based on the routing table corresponding to signal processing indicated by the data packet through a corresponding output buffer the switching module having a routing table indicative of an input source of a data packet and an output destination to output the data packet for execution of next processing, thereby controlling an order of signal processing;
executing, at a processing module of the signal processing device, when an output destination at said routing step is the processing module, processing indicated by a data packet transmitted from the first switching module through a corresponding output buffer with respect to the data packet and transmits the data packet to the first switching module through an input buffer which forms a set with the corresponding output buffer the processing module adapted to be an input source and an output destination in the routing table, and to execute signal processing indicated by a data packet transmitted from the switching module with respect to the data packet and transmits the data packet to the switching module side; and
routing, at a second switching module, when an output destination at said routing is the second switching module different from the first switching module, the second switching module using a routing table corresponding to signal processing indicated by a data packet transmitted from the first switching module through a corresponding output buffer to execute routing processing with respect to the data packet and to transmit the data packet to the first switching module through an input buffer which forms a set with the corresponding output buffer.

30. The non-transitory computer-readable medium according to claim 29, wherein the data packet includes a data type indicative of a type of signal processing and signal data to be processed, and when the switching module is connected with the processing module, the switching module inputs a data packet in which the signal data of the output data packet is processed according to the data type by the processing module.

31. The non-transitory computer-readable medium according to claim 30, wherein the data packet further includes a state portion having a state used to determine a destination for next processing of the data packet, the first switching module inputs a data packet in which the signal data of the data packet is corresponds to the data type processed by the processing module, and the value of the state portion represents a predetermined operation corresponding to the processing by the processing module, and the routing table is provided in accordance with a data type of a data packet in accordance with each switching module, and is indicative of at least one output destination where the data packet is processed next based on an input source of a data packet and a value of the state portion.

32. The non-transitory computer-readable medium according to claim 31, wherein when the output destination in said routing is a second switching module, the operations further comprise performing a predetermined operation with respect to a value of the state portion of the input data packet.

33. The non-transitory computer-readable medium according to claim 29, wherein a plurality of output buffers in one set of said input/output buffers are provided in accordance with each additional processing module to be connected to the processing module.

34. The non-transitory computer-readable medium according to claim 33, wherein the signal processing device comprises first and second switching modules, the first switching module being connected with the outside of the signal processing device and connected with a low-pass filter processing module which removes a high-frequency component of signal data included in an input data packet, wherein a state in the state portion indicates a number of times of processing to be executed in the processing module with respect to a data packet, the processing module executes processing corresponding to a data type with respect to signal data in an input data packet and adds 1 to a value of the state portion to output the data packet, the switching module adds 1 to a value of the state portion when outputting a data packet to the another switching module, and, when a data type of an input data packet is indicative of picture demodulation processing in analog television broadcasting the first switching module includes a first switching module routing table having:

a first entry which indicates the second switching module as an output destination when an input source of a data packet is the outside of the signal processing device and a value of the state portion in the data packet is 0;

a second entry which indicates the low-pass filter processing module as an output destination when an input source of a data packet is the second switching module and a value of the state portion in the data packet is 5; and a third entry which indicates the outside of the signal processing device as an output destination when an input source of a data packet is the low-pass filter processing module and a value of the state portion in the data packet is 6, the second switching module being connected with the first switching module and also connected with:

a band-limiting filter processing module which performs band limiting of signal data included in an input data packet;

a synchronous detection processing module which generates a signal synchronized with a carrier wave from signal data included in an input data packet; and a mixer processing module which mixes respective signals included in input two data packets, and, when a data type of an input data packet indicates picture demodulation processing in analog television broadcasting, the second switching module includes a second switching module routing table having:

a first entry which indicates the band-limiting filter processing module as an output destination when an input source of a data packet is the first switching module and a value of the state portion in the data packet is 1;

a second entry which indicates the synchronous detection processing module and a first output buffer of two output buffers for the mixer processing module as output destinations when an input source of a data packet is the band-limiting filter processing module and a value of the state portion of the data packet is 2;

a third entry which indicates a second output buffer of two output buffers for the mixer processing module as an output destination when an input source of a data packet is the synchronous detection module and a value of the detection portion of the data packet is 3; and a fourth entry which indicates the first switching module as an output destination when an input source of a data packet is the mixer processing module and a value of the state portion in the data packet is 4.

35. The non-transitory computer-readable medium according to claim 34, wherein, when a data type of a data packet input from the outside of said signal processing device indicates picture demodulation processing in an analog television broadcast, based on the first or the second switching module routing table, the operations further comprise:

setting, at the first switching module, a value of the state portion in the data packet to 1 by adding 1 thereto and outputting the data packet to the second switching module;

outputting, at the second switching module, the input data packet to the band-limiting filter processing module;

inputting, at the second switching module, the data packet which is input and executed processing and setting the value of the state portion to 2 by adding 1 thereto by the band-limiting filter processing module;

outputting, at the second switching module, the input data packet to the synchronous detection processing module and the first output buffer of the mixer processing module;

inputting, at the second switching module inputs the data packet which is input, executing processing and setting the value of the state portion to 3 by adding 1 thereto by the synchronous detection processing module;

outputting, at the second switching module, the input data packet to the second output buffer of the mixer processing module;

inputting, at the second switching module, the data packet which is input through the first output buffer and the second output buffer, executing processing and setting the value of the state portion to 4 by adding 1 thereto by the mixer processing module; setting, at the second switching module, the value of the state portion in the input data packet to 5 by adding 1 thereto and outputting the data packet to the first switching module;

outputting, at the first switching module, the input data packet to the low-pass filter processing module;

inputting, at the first switching module, the data packet which is input, executing processing and setting the value of the state portion to 6 by adding 1 thereto by the low-pass filter processing module; and outputting, at the first switching module, the input data packet to the outside of the signal processing device.

36. The non-transitory computer-readable medium according to claim 33, wherein the signal processing device comprises a first switching module and a second switching module, the first switching module being connected with the outside of the signal processing device and connected to a low-pass filter processing module which removes a high-frequency component of signal data included in an input data packet, wherein a state in the state portion indicates a number of times of processing to be executed with respect to a data packet in the processing module, the processing module executes processing corresponding to a data type with respect to signal data of an input data packet, adds 1 to a value of the state portion and outputs the data packet, and the switching module adds 1 to the value of the state portion when outputting the data packet to another switching module, and when a data type of an input data packet indicates audio demodulation processing in amplitude modulation radio broadcasting the first switching module includes a first switching module routing table having:

a first entry which indicates the second switching module as an output destination when an input source of a data packet is the outside of the signal processing device and a value of a state portion of the data packet is 0;

a second entry which indicates the low-pass filter processing module as an output destination when an input source of a data packet is the second switching module and a value of a state portion of the data packet is 4; and a third entry which indicates the outside of the signal processing device as an output destination when an input source of a data packet is the low-pass filter processing module and a value of a state portion of the data packet is 5, the second switching module being connected to the first switching module and connected to:

a synchronous detection processing module which generates a signal synchronized with a carrier wave from signal data included in an input data packet; and a mixer processing module which mixes respective signals included in input two data packets, and when a data type of an input data packet indicates audio demodulation processing in amplitude modulation radio broadcasting the second switching module includes a second switching module routing table having:

a first entry which indicates the synchronous detection processing module and a first output buffer of two output buffers for the mixer processing module as output destinations when an input source of a data packet is the first switching module and a value of a state portion of the data packet is 1;

a second entry which indicates a second output buffer of the two output buffers for the mixer processing module as an output destination when an input source of a data packet is the synchronous detection processing module and a value of a state portion of the data packet is 2; and a third entry which indicates the first switching module as an output destination when an input source of a data packet is the mixer processing module and a value of a state portion of the data packet is 3.

37. The non-transitory computer-readable medium according to claim 36, wherein when a data type of a data packet input from the outside of the signal processing device indicates audio demodulation processing in amplitude modulation radio broadcasting, based on the first or second switching module routing table, the operations further comprise:

setting, at the first switching module, a value of a state portion of the data packet to 1 by adding 1 thereto and outputting the data packet to the second switching module;

outputting at the second switching module, the input data packet to the synchronous detection processing module and the first output buffer of the mixer processing module;

inputting at the second switching module inputs the data packet processed by the synchronous detection processing module and setting a value of the state portion to 2 by adding 1 thereto;

outputting, at the second switching module, the input data packet to the second output buffer of the mixer processing module;

inputting, at the second switching module, the data packet which is input through the first output buffer and the second output buffer and processed by the mixer processing module set a value of the state portion to 3 by adding 1 thereto;

setting, at the second switching module, the value of the state portion of the input data packet to 4 by adding 1 thereto and outputting the data packet to the first switching module;

outputting, at the first switching module, the input data packet to the low-pass filter processing module;

inputting, at the first switching module, the data packet processed by the low-pass filter processing module and setting a value of the state portion to 5 by adding 1 thereto; and outputting, at the first switching module, the input data packet to the outside of the signal processing device.

* * * * *